US012811951B1

(12) United States Patent
Gray et al.

(10) Patent No.: US 12,811,951 B1
(45) Date of Patent: Nov. 24, 2026

(54) ARTIFICIAL-INTELLIGENCE-ASSISTED RETRIEVAL OF OPERATIONAL EVENTS USING GRAMMAR-BASED PARSE TREES AND A MODEL CONTEXT PROTOCOL INTERFACE

(71) Applicant: GRVTY, Inc., Arlington, VA (US)

(72) Inventors: Spencer Gray, Herndon, VA (US); Paul Jordan, Columbia, MD (US); Kyle Markham, Columbia, MD (US)

(73) Assignee: GRVTY, INC., Arlington, VA (US)

( * ) Notice: Subject to any disclaimer, the term of this patent is extended or adjusted under 35 U.S.C. 154(b) by 0 days.

(21) Appl. No.: 19/379,374

(22) Filed: Nov. 4, 2025

Related U.S. Application Data

(63) Continuation-in-part of application No. 19/378,185, filed on Nov. 3, 2025.

(51) Int. Cl.
*H04L 9/00* (2022.01)
*H04L 9/40* (2022.01)

(52) U.S. Cl.
CPC ........ *H04L 63/105* (2013.01); *H04L 63/0428* (2013.01); *H04L 63/20* (2013.01)

(58) Field of Classification Search
CPC .... H04L 63/20; H04L 63/0428; H04L 63/105
USPC .............................................................. 726/1
See application file for complete search history.

(56) References Cited

U.S. PATENT DOCUMENTS

| | | | | |
|---|---|---|---|---|
| 8,930,897 B2 * | 1/2015 | Nassar | G06F 11/362 | |
| | | | 717/124 | |
| 12,549,574 B1 * | 2/2026 | Morgan | G06F 21/53 | |
| 2020/0133441 A1 * | 4/2020 | Smith | G06F 3/0481 | |
| 2023/0111052 A1 * | 4/2023 | Ray | G06F 40/186 | |
| | | | 704/9 | |
| 2023/0409728 A1 * | 12/2023 | Li | G06F 16/9024 | |
| 2025/0291906 A1 * | 9/2025 | Kim | G06F 21/554 | |
| 2025/0371049 A1 * | 12/2025 | Braganza | G06F 16/33295 | |
| 2026/0134686 A1 * | 5/2026 | Hui-Bon-Hoa | B65D 77/046 | |

* cited by examiner

*Primary Examiner* — Josnel Jeudy
(74) *Attorney, Agent, or Firm* — GALVIN PATENT LAW LLC; Brian R. Gavin

(57) ABSTRACT

A system and method for artificial intelligence-assisted retrieval of operational events through a Model Context Protocol (MCP) server that encapsulates grammar-derived parse trees. The MCP server maintains structured operational notes (opnotes) organized by grammatical roles and exposes typed retrieval tools to AI agents, including credential location, tradecraft enumeration, and timeline reconstruction. The server validates tool invocations against policies and preconditions without exposing the underlying parse tree structure to agents. Upon validation, the server executes bounded, grammar-conformant queries, applies role-based redaction according to security clearances, and attaches field-level provenance metadata. The server returns structured results containing only facts necessary to satisfy the retrieval intent while maintaining complete encapsulation of tree topology. This architecture reduces computational load on AI agents, ensures deterministic policy-compliant responses, enables grammar evolution without interface changes, and provides auditable access control for secure operational intelligence workflows in cybersecurity environments.

7 Claims, 20 Drawing Sheets

ARTIFICIAL-INTELLIGENCE-ASSISTED RETRIEVAL OF OPERATIONAL EVENTS USING GRAMMAR-BASED PARSE TREES AND A MODEL CONTEXT PROTOCOL INTERFACE

CROSS-REFERENCE TO RELATED APPLICATIONS

Priority is claimed in the application data sheet to the following patents or patent applications, each of which is expressly incorporated herein by reference in its entirety:

Ser. No. 19/378,185

BACKGROUND OF THE INVENTION

Field of the Art

The present disclosure relates to intelligence analysis systems, and more particularly to systems and methods for using operational events.

Discussion of the State of the Art

Modern data generation has reached extraordinary scale, encompassing a wide array of formats and sources. Enterprises, government entities, and other organizations routinely produce massive volumes of information through digital platforms, sensor networks, and communication systems. New data streams emerge constantly, from sources including automated devices, social media activity, remote sensing technologies, and transactional logs, contributing to a dynamic and increasingly complex data environment. This surge in data availability offers both promise and complexity, as analysts and intelligent systems must sift through vast, heterogeneous datasets to extract meaningful insights. The process of organizing, correlating, and searching across these diverse inputs demands substantial computational resources and advanced analytical techniques to uncover patterns, trends, and actionable knowledge.

Data generated from diverse sources can exhibit multiple dimensions, including temporal and spatial aspects that provide critical context for analysis. Temporal characteristics may include timing, duration, sequences, or recurring patterns within data streams, while spatial characteristics may involve locations, movement, or distribution across physical or virtual environments. These multidimensional properties introduce complexity in data modeling, requiring techniques that can effectively account for interrelationships between time and space, as well as potential correlations across disparate data points. The ability to manage and leverage these aspects is essential for understanding underlying structures, predicting events, and identifying areas of interest within large-scale datasets, particularly when information is dynamic, distributed, or continuously evolving.

The timely analysis of multimodal data has implications across a wide array of applications and enterprise contexts, from operational planning to strategic decision-making. Efficient processing of information can support rapid situational awareness, risk assessment, and resource allocation, while delayed or incomplete analysis can lead to missed opportunities or unintended consequences. Consequently, there is an ongoing need to develop and refine techniques for integrating, analyzing, and interpreting complex data from multiple sources in a timely and reliable manner. Continuous improvements in computational methods, data management frameworks, and analytical strategies are essential for ensuring that organizations can effectively leverage the wealth of information available in increasingly data-rich environments.

SUMMARY OF THE INVENTION

Accordingly, disclosed embodiments provide systems and methods are disclosed for retrieving operationally significant information from structured operational notes (opnotes). An AI agent interfaces with an MCP server that encapsulates a grammar-derived parse tree and exposes typed retrieval tools (e.g., locate credentials, enumerate tradecraft, summarize target infrastructure, reconstruct task timelines). The agent never traverses the tree directly; instead, the MCP mediates all access and enforces policy- and schema-conformant responses. Upon successful validation, the opnotes file is input to a machine learning model configured to analyze behavioral characteristics associated with at least one of the actor or action. Based on this analysis, the system generates a context-aware output including a classification of the operational event and a risk score. The output is stored in association with the opnotes file, along with metadata for downstream retrieval and analysis, and transmitted to a remote computing device for review or automated response.

According to an aspect of an embodiment, there is provided a computing system for artificial intelligence-assisted retrieval of operational events, the computing system comprising one or more hardware processors configured for: maintaining a grammar-derived parse tree containing structured operational notes (opnotes), wherein the parse tree organizes operational events according to grammatical roles including actor, action, object, timestamp, and jurisdiction; providing a Model Context Protocol (MCP) server that encapsulates the grammar-derived parse tree; receiving, from an artificial intelligence (AI) agent, a typed tool invocation comprising schema-conformant parameters for retrieving operational information; validating the typed tool invocation against preconditions and organizational policy without exposing the parse tree structure to the AI agent; responsive to successful validation: resolving retrieval scope and applicable role-based visibility rules; compiling a bounded, grammar-conformant query plan; executing deterministic operations over the internal parse tree while hiding node and edge structure from the AI agent; formatting retrieved facts according to policy constraints; and attaching field-level provenance and confidence metadata to the retrieved facts; and returning a structured result to the AI agent containing only information necessary to satisfy the retrieval intent.

According to an aspect of an embodiment, the MCP server exposes a plurality of typed retrieval tools to the AI agent, the tools selected from: retrieve-credential, list-tradecraft, enumerate-targets, summarize-infrastructure, reconstruct-timeline, and fetch-linked-artifact.

According to an aspect of an embodiment, responsive to the typed tool invocation violating grammar constraints or organizational policy, the system is configured to: generate a structured refusal comprising machine-readable diagnostics; and provide a shortlist of permissible alternatives to enable reformulation without exposing internal tree topology.

According to an aspect of an embodiment, the system is further configured for: resolving a requester role from a role catalog mapping identities to operator, reviewer, or auditor privileges; evaluating the retrieval request against a policy store to determine whether the request is permitted, denied, or permitted with obligations; and responsive to the request being permitted with obligations, applying field-level redaction based on the resolved role.

According to an aspect of an embodiment, applying field-level redaction comprises: compiling applicable obligations including field-level masks, value generalization rules, and omission rules; executing the grammar-conformant query to produce a pre-redaction result set; applying the obligations via a redaction engine to generate redacted facts; and computing per-field confidence metrics based on retrieval provenance and structural consistency.

According to an aspect of an embodiment, the system is further configured to maintain an audit trail by: recording tool invocation parameters, policy decisions, and redaction rules applied; generating provenance digests for retrieved information; and storing the audit records in a distributed ledger or version-controlled repository.

According to an aspect of an embodiment, the structured result includes: operational facts satisfying the retrieval intent; provenance references indicating source nodes without revealing tree structure; confidence scores for each retrieved fact; and a redaction report summarizing rules that affected the result.

According to an aspect of an embodiment, there is provided a computer-implemented method for artificial intelligence-assisted retrieval of operational events, the method comprising the steps of: receiving, at a Model Context Protocol (MCP) server, a typed retrieval request from an artificial intelligence (AI) agent, wherein the request includes schema-conformant parameters and the MCP server encapsulates a grammar-derived parse tree; validating the parameters and preconditions without providing the AI agent access to the parse tree structure; determining whether the request satisfies grammar constraints and organizational policy; responsive to the request being valid: resolving applicable retrieval scope and role-based visibility rules; executing bounded operations over the internal parse tree to extract relevant facts; applying policy-based filtering and redaction to the extracted facts; generating provenance metadata and confidence scores for the filtered facts; and returning a structured response to the AI agent containing the filtered facts, provenance metadata, and confidence scores while maintaining encapsulation of the parse tree.

According to an aspect of an embodiment, there is provided a non-transitory computer-readable medium comprising instructions that, when executed by one or more processors, cause a computing system to: instantiate a Model Context Protocol (MCP) server that encapsulates a grammar-derived parse tree containing operational documentation; receive typed retrieval requests from artificial-intelligence agents through a constrained interface; validate requests against grammar rules and security policies without exposing tree structure; execute policy-aware queries to extract relevant operational facts; apply role-based redaction and attach provenance metadata; and return structured results that satisfy retrieval intents while preserving encapsulation.

According to an aspect of an embodiment, the instructions further cause the system to: maintain an immutable audit trail of all retrieval operations; support multiple concurrent artificial-intelligence agents through session isolation; enable grammar evolution without disrupting the MCP interface; and provide deterministic outcomes across different AI model versions.

BRIEF DESCRIPTION OF THE DRAWING FIGURES

FIG. 1 presents a comprehensive system architecture diagram for artificial intelligence (AI) assisted recording and documentation of cyber operations, employing grammar-based parse trees with Model Context Protocol (MCP) driven selective context exposure to achieve context-optimized documentation FIG. 2 is a block diagram illustrating an exemplary architecture to support AI-enabled recording of operational events using grammar-based parse trees and context-optimized documentation.

DETAILED DESCRIPTION OF THE INVENTION

Figure 1:
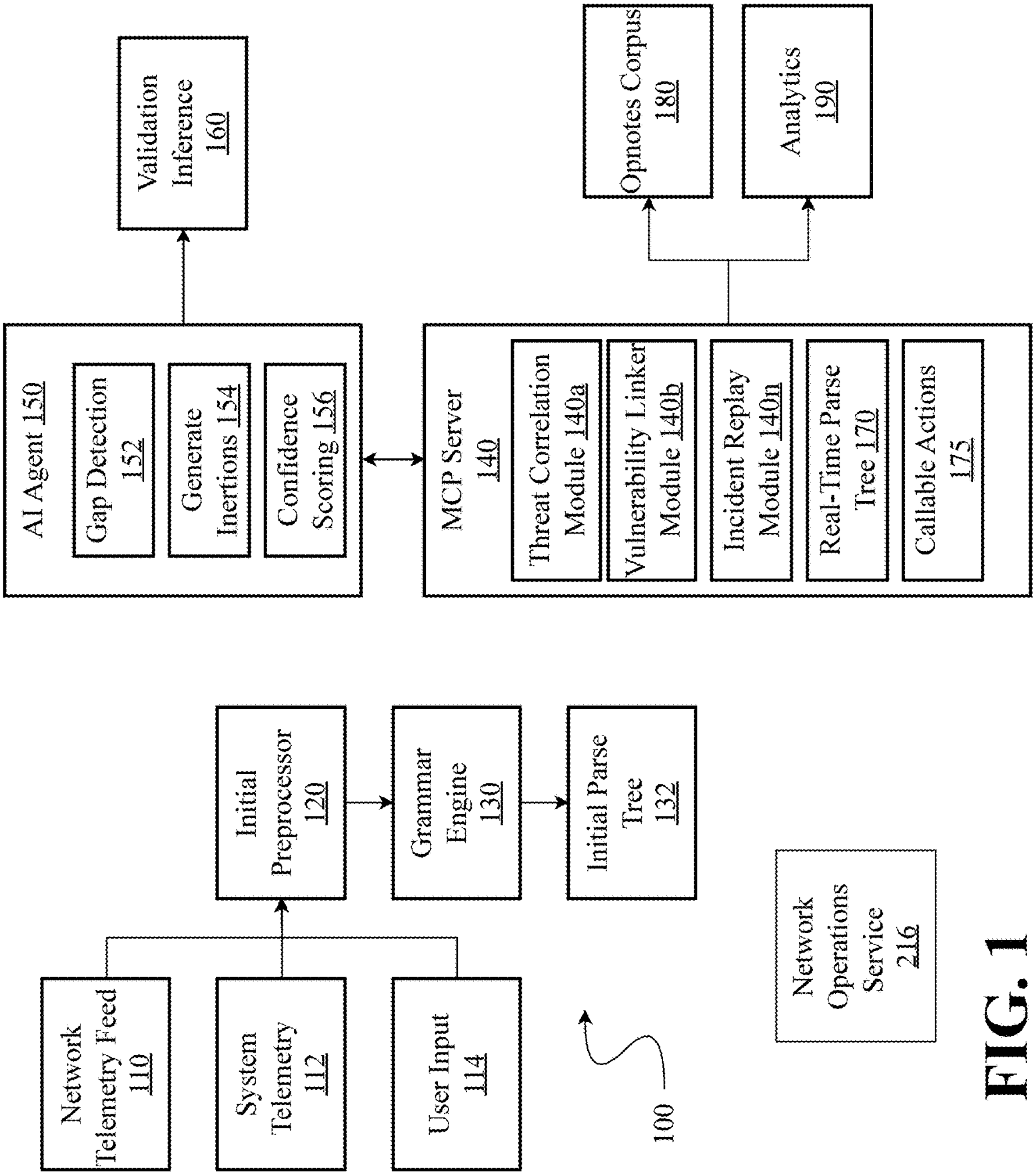

In various embodiments, the system and methods disclosed herein provide a retrieval pipeline whereby an AI agent obtains prior operational context from opnotes that have been structured according to a grammar-derived parse tree. The agent does not access or navigate the internal tree. Instead, an MCP server presents typed retrieval tools with schema-checked parameters and machine-readable results. Example tools include: retrieve-credential, list-tradecraft, enumerate-targets, summarize-infrastructure, reconstruct-timeline, and fetch-linked-artifact. Each tool invocation is deterministically mapped to safe tree queries and post-processing routines.

By hiding the parse tree behind the MCP interface, the system reduces cognitive load on the agent, bounds its branching factor, and ensures that all returned facts satisfy grammar constraints, redaction policy, and role-based visibility. The MCP may further compact context by surfacing only minimally sufficient cues (e.g., field stubs, localized diffs, provenance snippets) while preserving full-fidelity structures internally for validation and audit.

In high-stakes operational environments such as cybersecurity operations, emergency medical response, and industrial process monitoring, the ability to document events accurately and comprehensively is very important. Operational records, such as logs and operational notes ("opnotes") serve not only as real-time decision support tools but also as foundational artifacts for post-event analysis, training, auditing, and regulatory compliance.

Artificial intelligence (AI) agents operating on large structured datasets face inherent limitations due to context window constraints. As operational data scales, these agents must either truncate input or suffer degraded performance as their context windows approach capacity. This challenge is particularly acute in cybersecurity red-team exercises, where operational notes often span multiple layers of detail, including targets, tactics, findings, and evolving activities. Traditional approaches require AI agents to process entire files, which can lead to context overflow and reduced accuracy in both analysis and decision-making.

Post-operation analysis further compounds the issue, demanding systematic review of operational data to extract insights, identify behavioral patterns, and facilitate knowledge transfer. In the absence of a formally defined structure, such analysis becomes inconsistent and inefficient, forcing AI agents to expend context window space on learning syntax and grammar rules. Existing solutions lack intelligent, selective access mechanisms that preserve logical relationships between data elements. Accordingly, there is a need for a system that parses operational data into modular, accessible components, enabling high-performance AI workflows and consistent post-operation analysis without requiring deep syntactic interpretation.

Disclosed embodiments address the aforementioned issues by introducing a structured opnotes file format specifically designed for efficient ingestion and analysis by large language models (LLMs). This format captures operational data from cybersecurity exercises—including red-team simulations and live incident response—in a consistent, hierarchical structure comprising fields such as timestamp, event type, actor, action, and object. By enforcing a formal grammar and predictable syntax, the opnotes file enables reliable parsing and segmentation, allowing AI agents to access relevant portions of operational data without exceeding context window limitations.

Disclosed embodiments can further enhance LLM performance through a parse tree generation process and a Model Context Protocol (MCP) interface, which exposes discrete data segments as queryable resources. This architecture allows AI agents to retrieve targeted information, such as specific actions, findings, and/or behavioral patterns, without processing entire files or learning underlying grammar rules. As a result, disclosed embodiments can support scalable, high-fidelity analysis of complex operational datasets while preserving logical relationships between events. Moreover, disclosed embodiments can support systematic post-operation review, reduces context pollution, and ensures consistent data handling across cybersecurity workflows.

One or more embodiments can utilize language models and machine learning models that can process natural-language instructions to extract structured tasking parameters, including collection modality, geographic coverage, revisit timing, resolution, and priority. From these inputs, a system generates one or more executable tasking strategies, ranks them based on feasibility and predicted collection value, and selects appropriate assets from a multi-modal sensor inventory to support cybersecurity operations. Feedback from analyst validation and historical tasking success is used to update tasking models over time.

One or more embodiments may utilize resources such as a geodesic modeling and anomaly detection engine that can perform behavioral modeling across time-indexed latent embeddings. A geodesic behavior learner learns baseline trajectories representing typical adversary activity across domains and encodes event progressions such as reconnaissance, staging, and execution. A latent anomaly detector identifies deviations from learned trajectories, co-occurrences of domain signals that are statistically rare, and dislocations indicative of emerging threats. A device cohesion detector identifies coordinated device movement patterns such as unit-level staging or force assembly. A cross-modality query engine links anomalies across domains, while a causal path inference engine reconstructs latent trajectories by analyzing anomalies across multiple domains, performing both backward and forward causal tracing to identify latent precursors and project downstream consequences. This supports cross-domain anomaly triangulation, allowing detection of previously unlinked threat indicators across cyber, RF, and geospatial sources.

In one or more embodiments, incoming information can be scored against both physical and latent forecasts. Behavior alignment scores are computed to quantify conformity with predicted paths. When deviations exceed configured thresholds, alerts are issued and automated retasking initiated. Adversarial behaviors—such as trajectory spoofing or decoy use—are detected using latent anomaly classifiers and are used to refine behavior models and update scoring thresholds dynamically.

Group-level reasoning is supported by associating entities into coherent behavioral clusters across latent and physical domains. Group cohesion scores reflect alignment in space, time, velocity, and behavioral markers, enabling detection of convoy behavior, distributed staging, or decoupling maneuvers.

Custody records are maintained for each entity and include latent space association history in addition to physical tracking continuity. When continuity falls below threshold, a custody reacquisition process is initiated, including retroactive correlation, alternate hypothesis generation, and task plan modification. The reacquisition workflow may use latent drift patterns to guide recovery efforts.

Although specific implementations and workflows have been described herein, various modifications and alternative configurations may be employed without departing from the inventive concepts. Variations in latent space construction, geodesic modeling, twin maintenance, deterrence simulation, system topology, or user interface design are all considered within the scope of the disclosure. Functional components may be implemented in hardware, software, firmware, or hybrid configurations adapted to specific mission or operational requirements.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "operational note" or "opnote" refers to a record of activity, observation, or event generated during the execution of a task or mission within an operational environment. Opnotes may include user-entered annotations, system-generated entries, and/or AI-suggested content, and may serve as documentation for situational awareness, post-operation review, training, auditing, and/or compliance. Opnotes may be structured according to grammar-based parse trees and may be stored, transmitted, or displayed using standardized formats.

As used herein, "Model Context Protocol" or "MCP" refers to an industry-standard structured execution framework with a formal specification that enables task-specific processing of data such as parse trees. An MCP may define operational parameters, input/output formats, and orchestration logic for executing a given analytic or response task. MCPs are utilized by AI agents and other agentic entities in response to user prompts, though in some cases may be instantiated by them. MCPs may coordinate with ontology-based reasoning systems, plugin repositories, and response layers to support multi-domain deterrence operations.

As used herein, "parse tree" refers to a structured representation of input data generated by a grammar engine, wherein nodes correspond to syntactic elements and hierarchical relationships reflect grammatical dependencies. Parse trees may encode user input, telemetry signals, and/or system events in a format suitable for downstream processing, including AI-assisted analysis, validation, and augmentation. Parse trees may be transmitted to external systems, such as Model Context Protocol (MCP) servers, and may be updated to reflect inferred or missing information.

As used herein, "grammar engine" refers to a software component configured to parse input data according to predefined syntactic rules and generate structured representations, such as parse trees. Grammar engines may process user input, telemetry signals, and/or system events, and may enforce consistency, completeness, and compliance with domain-specific grammar models. Grammar engines may support modular rule sets, context-sensitive parsing, and integration with downstream components such as AI agents, validation systems, or documentation frameworks.

As used herein, "AI agent" refers to a computational entity configured to perform automated analysis, inference, and/or generation tasks based on input data and contextual parameters. AI agents may interface with grammar engines, parse trees, and/or external protocols to identify missing information, suggest refinements, or augment operational records. AI agents may operate in real-time or asynchronously, and may be constrained by context filters, validation protocols, and/or human-in-the-loop workflows to ensure accuracy, relevance, and trustworthiness of generated outputs.

As used herein, "scoring output" refers to a structured set of metrics computed by fusion scoring engine that quantifies behavioral conformity, identity continuity, and operational significance of observed activity. Scoring outputs may include behavior alignment scores, identity confidence scores, group cohesion scores, and custody degradation indicators. Scoring outputs may further include alert triggers, ISR retasking recommendations, and campaign feedback data, and may be annotated with source lineage, campaign identifiers, and timestamp metadata. Scoring outputs are disseminated to other subsystems such as dynamic tasking subsystem, campaign coordinator, or multi-source intelligence fusion system.

As used herein, "custody record" refers to a persistent data structure maintained by custody record manager that tracks the continuity, identity confidence, behavioral history, and source provenance of a monitored entity over time. A custody record may include version-controlled updates, scoring histories, lineage identifiers, and temporal annotations. Custody records support reacquisition workflows, confidence decay logic, and analytical auditing of entity behavior across interrupted, ambiguous, or deceptive reporting environments.

As used herein, "blockchain-based distributed ledger system" refers to a decentralized data storage architecture in which records are cryptographically linked and stored across multiple nodes in a tamper-evident, append-only format. In disclosed embodiments, opnotes files or associated metadata may be stored within such a system to ensure auditability, immutability, and verifiable provenance. Each transaction or update to an opnotes file is recorded as a block, with consensus mechanisms ensuring consistency across the distributed ledger. This architecture supports secure, traceable operational recordkeeping in adversarial or compliance-sensitive environments.

As used herein, "regular expression" refers to a symbolic pattern-matching syntax used to define search criteria for strings or structured text. In disclosed embodiments, regular expressions are applied to keyword fields or semantic tags within opnotes files to enable efficient filtering, classification, or retrieval of operational data. Regular expressions may be used by AI agents, search engines, and/or user interfaces to extract relevant subsets of opnotes content without requiring full file parsing or manual inspection.

As used herein, "journaling filesystem" refers to a file storage system that maintains a log (or journal) of changes prior to committing them to the main filesystem, thereby supporting atomic write operations and rollback capabilities. In disclosed embodiments, opnotes files may be stored on a journaling filesystem to ensure data integrity in multi-user environments or during concurrent AI agent access. The journaling mechanism enables recovery from partial writes, system crashes, or conflicting updates, preserving the consistency and reliability of operational records.

As used herein, "semantic tag" refers to a structured label or keyword associated with a portion of an opnotes file that conveys contextual meaning or operational relevance. Semantic tags may include descriptors such as "exfiltration," "privilege escalation," or "credential reuse," and are used by large language models (LLMs) to guide attention, prioritize content, or filter responses. In disclosed embodiments, semantic tags are stored in a dedicated field within the opnotes file structure and are leveraged by the Model Context Protocol (MCP) interface to enable targeted, context-efficient AI queries.

As used herein, "large language model" (LLM) refers to a machine learning model trained on vast corpora of text data to perform natural language understanding, generation, and reasoning tasks. In disclosed embodiments, LLMs are used to analyze opnotes files, generate behavioral characterizations, identify documentation gaps, or assist in post-operation analysis. The system optimizes LLM performance by exposing only relevant, structured segments of operational data through a grammar-compliant interface, thereby preserving context window capacity and improving response accuracy.

Conceptual Architecture

FIG. 1 presents a comprehensive system architecture diagram for artificial intelligence (AI) assisted recording and documentation of cyber operations, employing grammar-based parse trees with Model Context Protocol (MCP) driven selective context exposure to achieve context-optimized documentation 100. The architecture begins with three distinct data source categories positioned on the left side of the diagram. The Network Telemetry Feed 110 ingests real-time security-relevant data including intrusion detection system (IDS) and intrusion prevention system (IPS) alerts, stateful firewall logs capturing connection attempts and protocol anomalies, and deep packet captures for forensic analysis. The System Telemetry 112 component processes operating system event logs, application-layer audit trails, authentication and authorization attempts including failed login sequences, and process execution chains that may indicate lateral movement or privilege escalation. User input 114 captures human-generated annotations from security analysts conducting threat hunting operations, red-team operators documenting exploitation attempts and defensive evasion techniques, and incident responders recording remediation actions and containment measures.

These heterogeneous data streams converge at the input preprocessor 120, which performs critical normalization operations essential for downstream processing. The preprocessor executes format normalization to convert disparate data schemas into a unified representation, performs timestamp harmonization across systems with different clock sources and time zones, implements tokenization to segment continuous streams into discrete semantic units suitable for grammatical parsing, removes duplicate entries that may arise from redundant logging mechanisms or multiple sensor observations of the same event, filters irrelevant noise using configurable relevance thresholds, and annotates each entry with comprehensive metadata including source reliability weights, geolocation tags derived from IP addresses or GPS coordinates, environmental conditions, and operator identity markers. The preprocessor validates data against grammar entry rules, checking for required fields, enforcing syntactic constraints, verifying semantic coherence, and ensuring compatibility with downstream parse tree generation. For sensitive environments, the preprocessor may employ fast symmetric encryption algorithms for data-at-rest with asymmetric key exchange for secure credential management, ensuring confidentiality throughout the processing pipeline.

The preprocessed stream feeds into the grammar engine 130, which implements formal syntactic and semantic parsing to generate an initial parse tree 132. The Grammar Engine maintains dual parsing capabilities, supporting both Concrete Syntax Trees (CST) when precise syntactic fidelity is required for preserving exact token order, punctuation, and formatting for downstream validation or reconstruction, and Abstract Syntax Trees (AST) when semantic interpretation and logical structure take precedence over surface syntax, enabling tasks such as event classification, causal inference, and AI-assisted augmentation. The engine enforces grammar rules expressed in Backus-Naur Form or similar formal specifications, organizing events according to hierarchical structures that capture actor-action-object-timestamp-jurisdiction relationships while detecting missing entities, null nodes, semantically underspecified elements, and temporal inconsistencies that require augmentation. The initial parse tree 132 represents a structured, hierarchical interpretation that captures both the explicit content and implicit relationships within the operational data stream, with each node maintaining fields for timestamps indicating when operational events were recorded, event types selected from predefined categories including command execution, system response, and operator observation, and technical details comprising system identifiers, command parameters, output values, and contextual metadata.

The Initial Parse Tree 132 is transmitted to the Model Context Protocol (MCP) Server 140, which functions as an intelligent context management and orchestration platform hosting multiple specialized analytical modules 142*a*-142*n*. The threat correlation module 142*a* performs cross-system event mapping to identify coordinated attack campaigns, correlating seemingly disparate indicators across network, endpoint, and application layers to reveal advanced persistent threat (APT) behaviors, while maintaining association histories for entity tracking and behavioral clustering. The vulnerability linker module 142*b* associates observed exploitation attempts with Common Vulnerabilities and Exposures (CVE) databases, enriching events with vulnerability severity scores from the Common Vulnerability Scoring System (CVSS), available patches from vendor advisories, and compensating controls from security configuration baselines. The incident replay module 142*n* reconstructs attack sequences for forensic analysis, simulating adversary tactics, techniques, and procedures (TTPs) mapped to the MITRE ATT&CK framework to validate detection coverage and identify defensive gaps in the security posture.

The MCP Server 140 implements selective subtree exposure algorithms that evaluate multiple criteria to determine which portions of the parse tree should be exposed to the AI Agent. These algorithms consider relevance thresholds computed based on semantic proximity to recent operational events using vector similarity measures in latent space, operational priority classifications derived from asset criticality and threat severity matrices, computational resource constraints including available memory and processing capacity, and security classifications that may restrict access to certain operational details. This selective exposure mechanism prevents context overload while preserving essential situational awareness, addressing fundamental limitations of conventional AI documentation systems that attempt to process entire operational streams without discrimination. The MCP Server may integrate with latent space construction subsystems that create coherent multimodal representations through contrastive learning, aligning cyber, imagery, RF, and text modalities by projecting each into a common embedding space with shared geometric structure, enabling cross-domain reasoning about security events.

The MCP Server 140 establishes bidirectional communication with an AI Agent 150, which performs multi-stage analysis to enhance operational documentation. The Gap Detection subsystem 152 systematically identifies required grammar elements for each event type, evaluates populated fields against the grammar-defined structure to locate missing or incomplete nodes, detects ambiguous references that lack sufficient specificity, identifies temporal gaps where expected events are absent from the sequence, and invokes pruning routines to remove or collapse irrelevant branches when nodes are determined to be inapplicable, thereby optimizing memory utilization and processing cycles. The generate insertions subsystem 154 cross-references multiple external context sources to resolve identified gaps, including system logs from standard logging directories, firewall configuration databases containing rule sets and policy definitions, network traffic analysis derived from packet captures and flow records, historical entries in the opnotes corpus providing precedent and pattern matching, and correlated telemetry from related systems offering complementary perspectives on events. The Confidence Scoring subsystem 156 computes calibrated probability scores for each candidate insertion using an ensemble of evidence signals including model-based likelihoods from machine learning classifiers trained on historical operational data, statistical correlations derived from log analysis and pattern matching, provenance and source reliability weights based on sensor fidelity and historical accuracy, timestamp alignment with known event sequences, consistency with recent operational context, and calibration factors derived from historical operator accept/reject outcomes in the validation workflow.

In some embodiments, MCP server 140 comprises one or more real-time parse tree data structures. An MCP server 140 may define operational parameters, input/output formats, and orchestration logic for executing a given analytic or response task. AI agents 150 connect directly to MCP servers, which contain real-time parse trees and other relevant data. MCPs are utilized by AI agents and other agentic entities in response to user prompts, though in some cases may be instantiated by them. Through their modular, single-purpose design, MCP servers may coordinate with ontology-based reasoning systems, plugin repositories, and response layers to support multi-domain deterrence operations. The MCP server provides an interface which abstracts away some of the complexity of the parse tree to reduce the processing load of a given AI agent. Instead, the AI agent only interfaces with the MCP server which manages the parse tree.

In various embodiments, the system of FIG. 1 employs a MCP server in which the actions 175 available to an AI agent are exposed as MCP tools. MCP tools are callable functions with structured parameters (e.g., JSON-schema-defined fields) and machine-readable results that trigger external effects or state transitions in the system. Tools are distinct from MCP resources, which are read-only context providers; tools do things, while resources inform those actions. By constraining agent interaction to tool invocation rather than free-form editing, the system achieves deterministic validation, auditable side effects, and predictable failure semantics.

Traditional MCP tools utilized by the system include, by way of example and not limitation, file and code operations (reading and writing files, invoking formatters or tests, executing bounded shell commands), web and HTTP operations (fetching URLs, issuing parameterized REST/RPC calls), source control and DevOps actions (creating branches, committing changes, initiating CI/CD tasks, querying logs), productivity integrations (creating or reading calendar events, sending or drafting emails, inserting notes or documents, opening tasks), and data operations (issuing SQL/NoSQL queries, performing vector-store search/upsert, running retrieval pipelines). In enterprise deployments, additional tools may map to organizational systems, such as creating or updating CRM/ERP records, filing support tickets, or performing HRIS lookups. Each tool declares preconditions, parameter types, expected postconditions, and error codes, allowing the orchestration layer to accept, adapt, or reject agent proposals with deterministic behavior.

To reduce cognitive load and improve reliability, the internal document grammar and parse-tree structures may not be surfaced as tools or resources. Instead, the MCP server presents higher-level, typed intents (e.g., classify an event, propose field values, request a constrained mutation, validate against a schema) that encapsulate the underlying tree operations. When an agent invokes a tool that would violate grammar constraints or organizational policy, the MCP server returns a structured refusal alongside corrective hints and a shortlist of valid alternatives. This separation of concerns bounds the agent's branching factor, preserves interface stability as the internal grammar evolves, and yields consistent, reproducible outcomes across different model providers and versions.

The AI agent's proposals are forwarded to a Validation Interface 160, which implements a comprehensive human-in-the-loop workflow enabling analysts to maintain oversight and accountability in the documentation process. The interface presents proposed insertions with associated confidence scores and supporting evidence, enabling operators to accept insertions that accurately reflect operational reality, edit proposals to correct minor inaccuracies or add additional context, reject insertions that are erroneous or misleading, and optionally redact sensitive information that should not be preserved in the permanent record. The interface supports role-based access controls aligned with security clearance levels and operational responsibilities, maintains comprehensive audit trails documenting all acceptance, rejection, and modification decisions, provides contextual explanations for AI proposals to facilitate informed decision-making, and enables batch processing of multiple proposals for efficiency during high-tempo operations. This human oversight mechanism ensures that final opnotes reflect both AI-assisted enhancements and human judgment, promoting accuracy, accountability, and trustworthiness in operational documentation.

In some embodiments, validated insertions flow to a Real-Time Parse Tree, which maintains the authoritative current operational state through sophisticated distributed synchronization mechanisms. The parse tree may be implemented using a distributed ledger providing immutable, cryptographically-secured record keeping with consensus mechanisms ensuring consistency across nodes, or a version control protocol enabling branching, merging, and rollback capabilities similar to software development workflows. The infrastructure supports multi-user synchronization across concurrent analyst sessions, employing conflict resolution engines to reconcile simultaneous edits from multiple operators, synchronization services to propagate validated changes to all active user interfaces in real-time, and eventual consistency models to balance responsiveness with accuracy in distributed deployments. This architecture ensures that all team members operate with a consistent, up-to-date view of operational documentation, critical for coordinated incident response and red team exercises where multiple analysts may be documenting different aspects of the same operational sequence.

In some aspects, the real-time parse tree feeds into two critical downstream components. First, an Opnotes Corpus 180 serves as a secure historical repository for finalized operational records, implemented as a versioned database system with cryptographic integrity verification, supporting full-text search and structured queries across historical events. The corpus enables Training functions where historical accept/reject decisions refine AI confidence scoring models, successful insertion patterns improve gap detection algorithms, and operator feedback adjusts relevance thresholds and context windows. It also supports grammar evolution through adaptive refinement of parsing rules based on observed operational patterns, statistical analysis of common event structures and sequences, incorporation of new event types as threats evolve, and optimization of grammar rules to reduce ambiguity and improve parsing efficiency. In some embodiments, an opnotes file is scoped to a single operator and a single workday, such that it aggregates all operationally significant events authored by that operator during that day. This scoping allows AI agents to traverse multiple opnotes files associated with a given target or engagement and rapidly reconstruct current status, historical context, and pending actions without wading through unrelated material. To further streamline agent interaction, the system routes requests through an MCP server that manages the underlying concrete syntax tree; the agent invokes typed tools and receives structured results, while the CST and low-level tree manipulations remain encapsulated. This separation reduces complexity for the agent, improves reliability, and preserves a stable interface even as the internal grammar evolves. Second, an Analytics and Reporting module 190 generates comprehensive operational intelligence outputs including documentation completeness scores measuring coverage and detail levels across operational phases, incident timelines reconstructing attack progressions and defensive responses, anomaly density metrics quantifying the concentration and distribution of unusual events, statistical summaries of operational tempo and resource utilization, causal chains linking initial compromise to ultimate impact, and compliance reports demonstrating adherence to documentation standards and regulatory requirements.

The architecture optionally incorporates a network operations service 216 that provides supplementary context through internal and external network analysis capabilities. This service interfaces with network infrastructure to retrieve configuration states from routers, switches, and firewalls, monitors traffic patterns for behavioral anomalies and protocol violations, correlates network events with endpoint and application-layer observations, and provides topology awareness for understanding lateral movement paths and segmentation boundaries. The dashed connection to the MCP Server indicates its optional but valuable contribution to contextual enrichment, particularly in environments where network behavior provides critical indicators of adversary activity.

A feedback loop from the Opnotes Corpus back to the Grammar Engine enables continuous improvement through historical pattern analysis and grammar refinement, creating an adaptive system that evolves with operational practices and threat landscapes. The architecture incorporates multi-modal input stream capabilities enabling voice commands transcribed through speech-to-text engines, keystroke logs capturing command-line interactions, GUI interactions recorded through screen capture APIs, and system responses from automated defensive tools to be encoded into a single grammar-compliant structure, providing seamless integration of diverse data types into a unified operational record. The entire system operates with selective context exposure at its core, maintaining computational efficiency while preserving operational security, implementing human oversight through validation workflows that balance automation with accountability, supporting distributed team operations through sophisticated synchronization mechanisms, and producing structured, searchable, and analytically-valuable documentation suitable for immediate operational support, post-action review, training scenarios, compliance auditing, and long-term knowledge retention.

Figure 2:
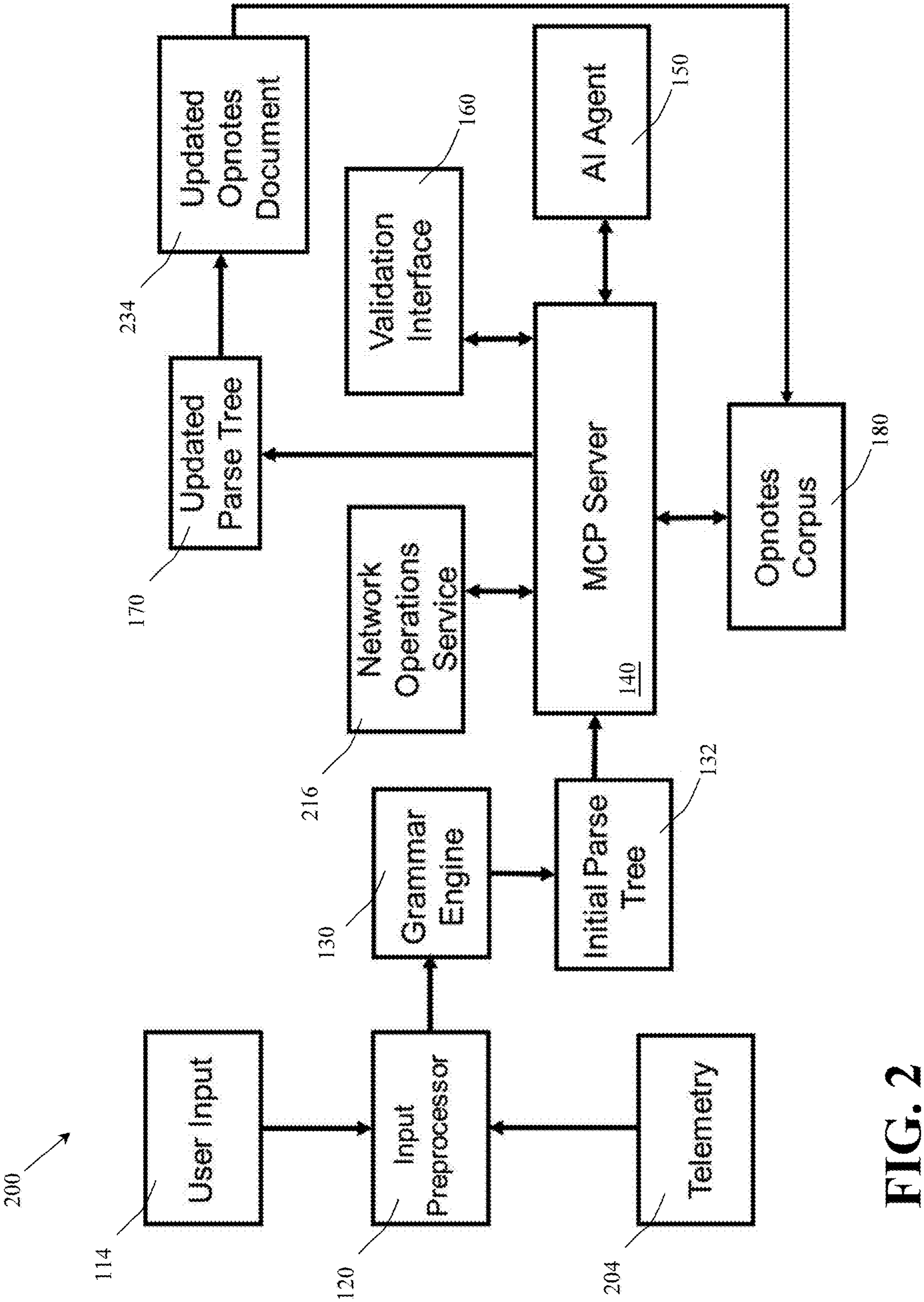

FIG. 2 is a block diagram 200 illustrating an exemplary architecture for AI-assisted recording of operational events using grammar-based parse trees and context-optimized documentation. User input 114 may include manually entered notes based on observed events, relayed information, and/or other operator-generated content. Telemetry data 204 may include sensor readings, automated surveillance outputs, system log entries, and/or similar machine-generated signals. An input preprocessor 120 receives both user input 114 and telemetry data 204, performing preprocessing operations to generate a unified input stream. This input stream is provided to a grammar engine 130, which is configured to generate an initial parse tree 132. The initial parse tree 132 represents a hierarchical structure of the input stream, with fields such as actor, object, and event, among others, organized according to domain-specific grammar rules. The initial parse tree 132 is transmitted to an MCP server 140, which is a computing system configured to host and manage multiple Model Context Protocol (MCP) modules. In some embodiments, MCPs may be implemented as pluggable components, each capable of performing defined operations such as anomaly detection, semantic enrichment, compliance tagging, causal inference, and other analytical tasks.

The MCP server 140 interfaces with an AI agent 150. In various embodiments, the MCP server 140 functions as a context filter, selectively exposing portions of the initial parse tree 132 to the AI agent 150. This selective exposure enables the AI agent 150 to analyze, augment, and optimize documentation without processing the entire tree, thereby improving computational efficiency. The AI agent 150 may be configured to monitor ongoing operations, detect missing or ambiguous entries, and propose grammar-compliant additions to enhance the quality and completeness of operational notes. By focusing only on relevant subtrees, the AI agent 150 conserves key computing resources such as processor cycles and memory bandwidth, while maintaining high responsiveness. In embodiments, the MCP server is configured to expose subtrees based on a predetermined condition. In embodiments, the predetermined condition includes at least one of a relevance threshold and an operational priority. In this way, disclosed embodiments enable selective context sharing with AI agents, reducing computational overhead while preserving critical situational awareness.

In embodiments, a relevance threshold refers to a computed metric used to determine whether a given subtree or information item within a parse tree warrants exposure to an AI agent for further analysis or augmentation. The relevance threshold can serve as a gating mechanism, enabling selective context sharing that balances completeness with computational efficiency. In embodiments, the relevance threshold is determined based on semantic proximity to recent operational events.

In one or more embodiments, a validation interface 160 enables human operators to review, accept, reject, or modify AI-generated suggestions, thereby maintaining oversight and accountability. The validation interface 160 may communicate with the MCP server 140 via exposed APIs, such as RESTful interfaces or similar protocols. Through coordinated interaction with the AI agent 150, the MCP server 140 can produce an updated real-time parse tree 170. This updated parse tree 170 may include modifications to existing fields, insertion of new nodes, or enrichment of contextual annotations derived from both human and AI contributions.

The updated parse tree 170 may be used to generate an enhanced, updated opnotes document 180, which incorporates additional relevant information that may have been omitted from the original input stream. These enriched opnotes provide context-optimized documentation suitable for real-time use and post-operation analysis. In addition to updated information, the updated opnotes document 234 can include metrics such as confidence levels and anomaly density metrics. One or more embodiments are further configured to generate analytic outputs based on the real-time parse tree, the analytic outputs comprising one or more of statistical summaries, causal chains, documentation completeness scores, and anomaly density metrics. In one or more embodiments, the anomaly density metrics can include a measure of the concentration and distribution of anomalous events within a defined temporal or spatial window, such as the number of anomalies per minute of operation and the ratio of flagged events to total events within a subsystem, and may be computed by sliding window aggregation across event logs or vector-based clustering of anomaly classifications using unsupervised learning techniques. One or more embodiments can support a multi-modal input stream that enables voice commands, keystroke logs, and system responses to be encoded into a single grammar-compliant structure. This feature can provide seamless integration of diverse data types into a unified operational record, enhancing accessibility and reducing fragmentation across input modalities.

In some embodiments, the updated opnotes document 234 may be stored in an opnotes corpus 180. The opnotes corpus

180 serves as a historical repository that can be accessed by MCP modules for model fine-tuning and retraining. In embodiments, one or more embodiments can further include adaptive grammar evolution, in which the grammar specification dynamically adjusts over time based on operator feedback, usage statistics, and/or domain-specific shifts. This ensures that the documentation structure remains aligned with actual operational practices, improving usability and long-term relevance. In embodiments, the opnote corpus 180 may support multi-user operation. In embodiments, the opnote corpus may be implemented as a secure database, blockchain ledger, versioned database system, and/or other suitable structure. In embodiments the computing system is further configured for multi-user operation across distributed teams, and wherein the real-time parse tree is synchronized across multiple user sessions in real time. In some embodiments, real-time synchronization of the real-time parse tree across multiple user sessions is achieved using one or more of, a distributed ledger, a version control protocol, a conflict resolution engine configured to reconcile concurrent edits, and a synchronization service configured to propagate validated changes to all active user interfaces.

Human operator feedback captured via the validation interface 160 may be incorporated into a retraining process, enabling the system to adapt over time and produce increasingly accurate and efficient documentation with minimal human intervention. In some embodiments, the MCP server 140 may interface with a network operations service 216. The network operations service 216 can provide access to internal or external networks, enabling retrieval and analysis of network traffic, system alerts, and communication logs. This service may supplement the input stream with additional context derived from observed network activity, such as connection attempts, protocol anomalies, and/or correlated system events. By incorporating network-derived insights into the parse tree, the system can enhance the completeness and relevance of operational notes, particularly in environments where network behavior is a critical component of situational awareness.

Figure 3:
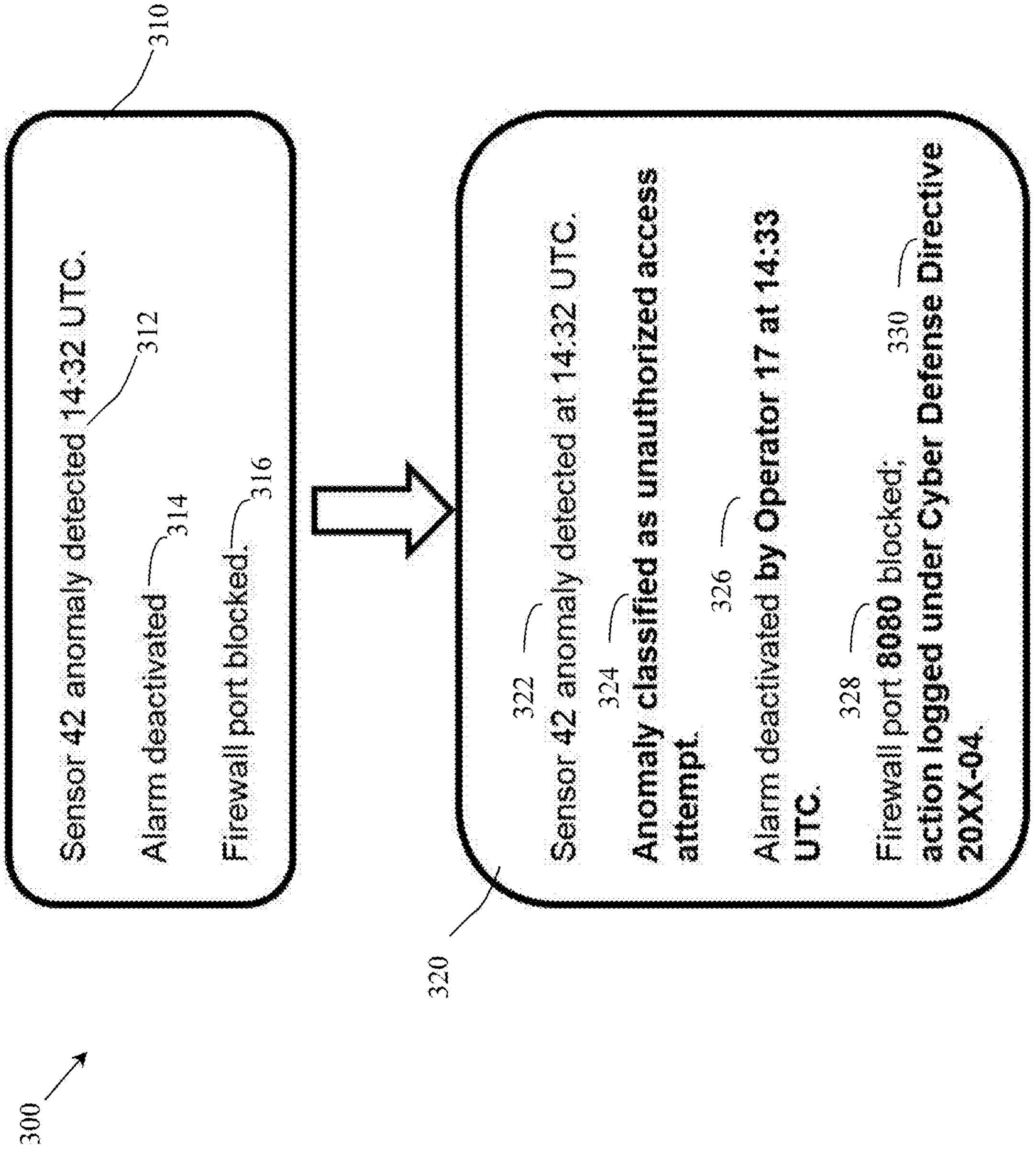
FIG. 3 illustrates an example of automatic enhanced opnotes generation, in accordance with one or more embodiments.

FIG. 3 illustrates an example 300 of automatic enhanced opnotes generation, in accordance with one or more embodiments. In the example shown, input stream 310 includes three distinct items of information. Information item 312 comprises a telemetry report from a sensor, accompanied by a timestamp. Information item 314 includes a user-provided entry stating "alarm deactivated." Similarly, information item 316 includes a user-provided entry stating "firewall port blocked."

Updated opnotes document 320 represents the output generated from input stream 310 after processing by a disclosed embodiment. As shown, the opnotes document 320 includes four items of information. Information item 322 is a direct copy of the telemetry report originally provided as item 312. Information item 324 is a newly generated entry, derived from context analysis of the input stream. In this example, item 324 classifies the anomaly as an unauthorized access attempt. In some embodiments, context analysis may be performed by one or more machine learning models, such as a large language model (LLM), which can enrich telemetry events like item 322 with additional context useful for real-time decision-making and post-operation review.

Item 326 illustrates enhancement of a user-provided input from the original stream. Referring again to item 314, the input merely states "alarm deactivated" without specifying who performed the action or when it occurred. Grammar engines can generate parse trees that include entities such as actors and timestamps, effectively capturing the "who" and "when" of an event. When such entities are missing, as in item 314, disclosed embodiments may infer the missing details through context analysis, log scraping, historical data, or other available sources. In the updated opnotes, item 326 annotates the original event with an actor and timestamp, indicating that the alarm was deactivated by operator 17 at 14:33 UTC."

Likewise, item 328 provides enriched context for item 316 from the input stream. While item 316 simply notes that a firewall port was blocked, it lacks specifics. In contrast, item 328 identifies the blocked port (port 8080) and includes an additional annotation, item 330, indicating the authority or rationale behind the action. In some embodiments, the AI agent, via access to the network operations service and other system components, can supplement operator actions with missing details. For instance, a human operator may be under time pressure and omit critical information such as which port was disabled as a result of a firewall configuration. Disclosed embodiments can retrieve this data by scanning system logs (e.g., /var/logs) or detecting changes in network traffic patterns, and update the opnotes accordingly. This approach can enable a more complete and accurate record of coordinated activities.

Figure 4:
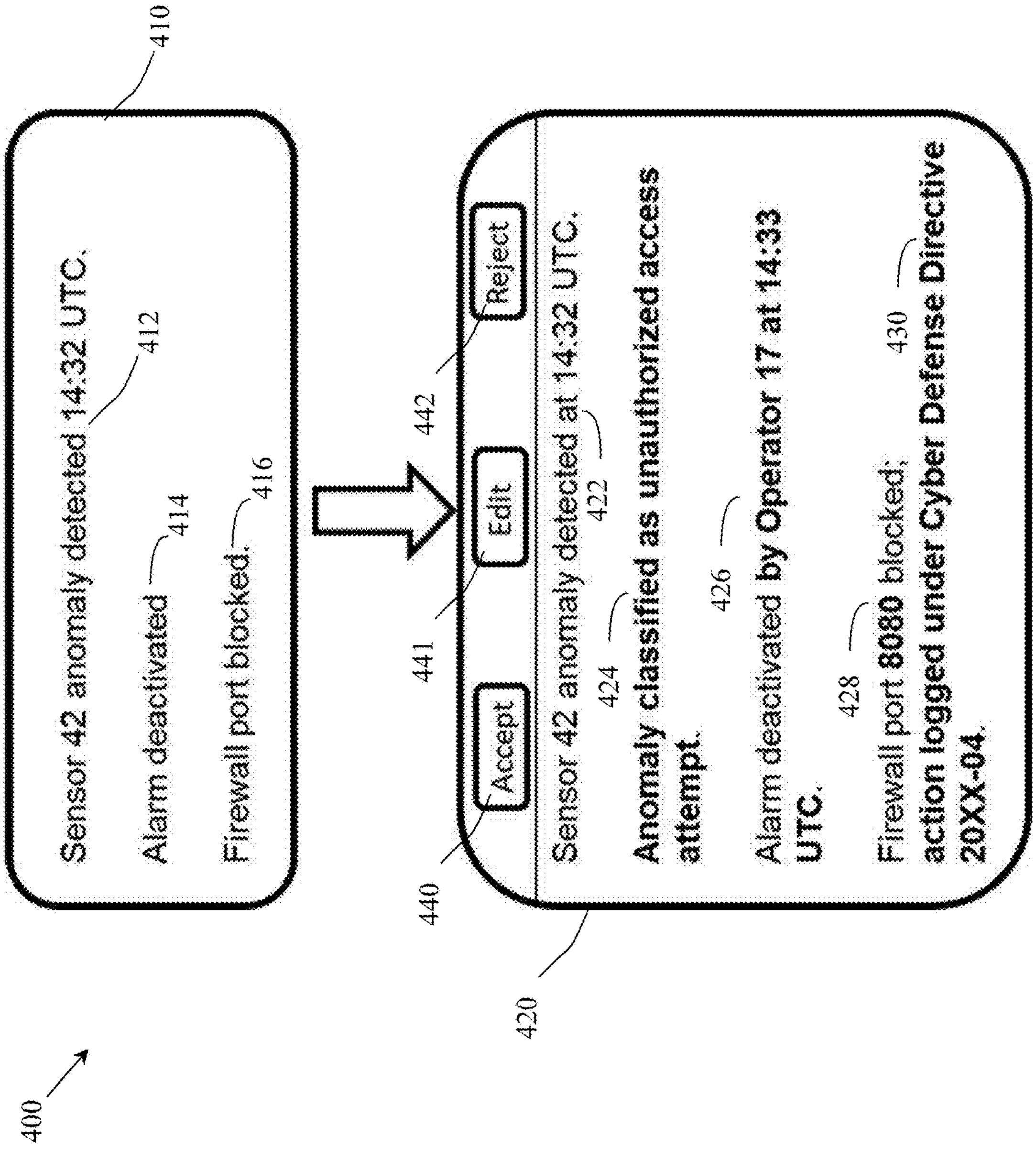
FIG. 4 illustrates an example of enhanced opnotes generation with an operator confirmation option, in accordance with one or more embodiments.

FIG. 4 illustrates an example 400 of enhanced opnotes generation with operator confirmation, in accordance with one or more embodiments. The figure includes an input stream 410 that is structurally similar to input stream 310 of FIG. 3. Information item 412 comprises a telemetry report from a sensor, accompanied by a timestamp. Information item 414 includes a user-provided entry stating "alarm deactivated," while information item 416 includes a user-provided entry stating "firewall port blocked."

In contrast to the embodiment shown in FIG. 3, which performs automatic annotation and enhancement, the embodiment of FIG. 4 incorporates human oversight via an opnote validation interface 420. The opnote validation interface 420 includes interactive controls such as an accept button 440, an edit button 441, and a reject button 442. In some embodiments, the opnote validation interface 420 may be configured to require operator review of each proposed addition or modification generated by the system. For example, an operator may choose to accept information item 422, reject information item 424, accept items 426 and 428, and edit item 430. This human-in-the-loop workflow ensures that final opnotes reflect both AI-assisted enhancements and human judgment, thereby promoting accuracy, accountability, and trustworthiness in operational documentation. One or more embodiments can include providing the one or more grammar-compliant insertions to a human operator for validation. In some embodiments, in addition to the buttons shown in FIG. 4, other buttons, such as a "Redact" button may also be included. The redact button can enable selective redaction mechanisms and access controls that can limit visibility of sensitive nodes in the parse tree. These features can preserve confidentiality while maintaining analytic utility, making disclosed embodiments suitable for regulated or classified environments. Thus, disclosed embodiments can provide selective context exposure and human-in-the-loop validation, yields technical advantages not obtainable by straightforward combination. These advantages can include reduced computational overhead, improved accuracy, and enhanced security.

Figure 5:
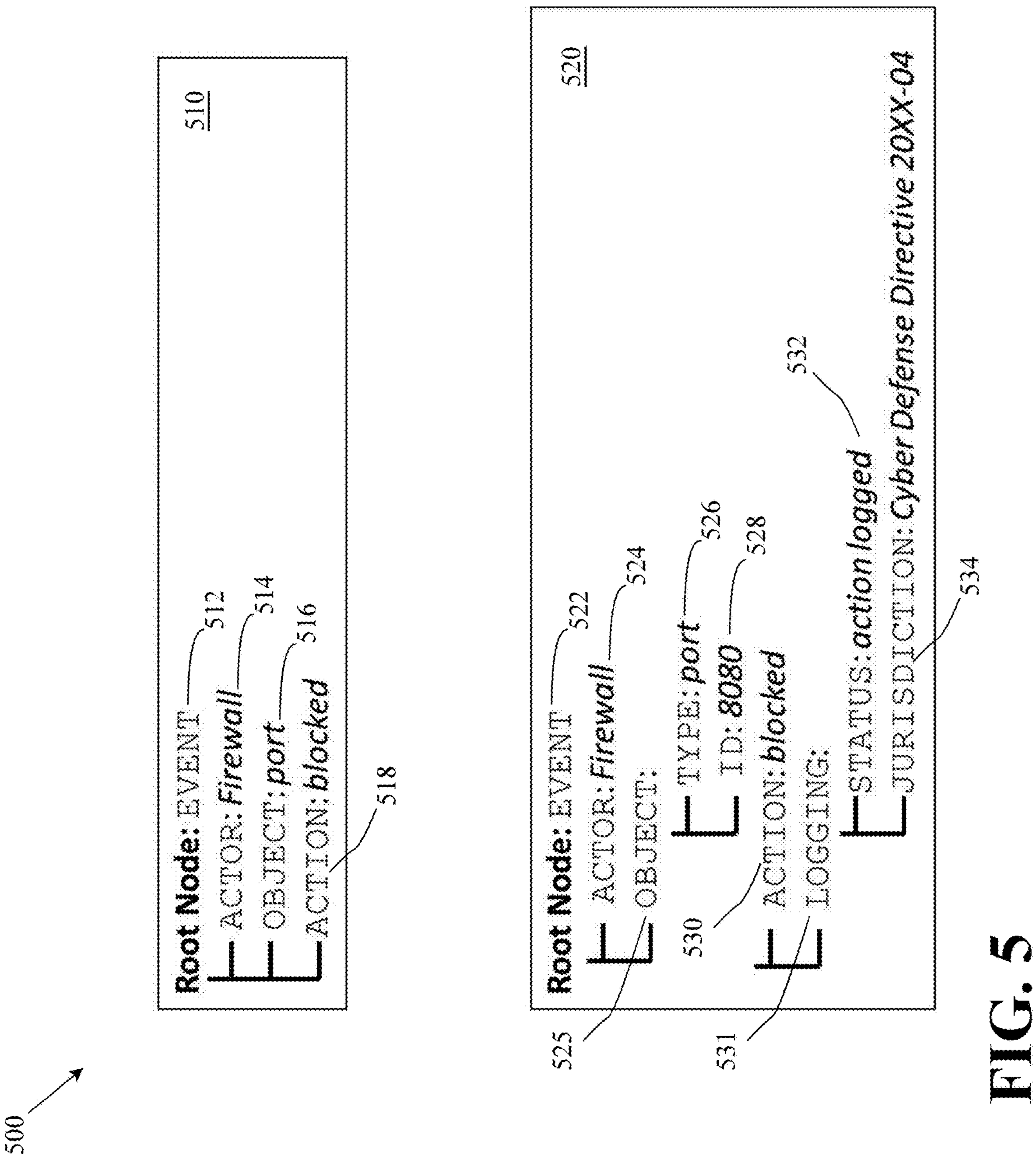
FIG. 5 shows an exemplary initial parse tree and corresponding updated real-time parse tree, in accordance with one or more embodiments.

FIG. 5 illustrates an example 500 that includes an initial parse tree and a corresponding updated real-time parse tree, demonstrating how disclosed embodiments enrich structured representations of operational events. The initial parse tree 510 includes a root node of type "event," indicated at 512. Branching from the root are three child nodes: node 514 of type "actor," with a value of "firewall"; node 516 of type "object," with a value of "port"; and node 518 of type "action," with a value of "blocked." This initial structure captures the basic elements of the event but lacks specificity and contextual depth.

The corresponding updated real-time parse tree, shown at 520, reflects enhancements derived from contextual analysis. Like the initial tree, it includes a root node of type "event," indicated at 522, with a child node 524 of type "actor" and a value of "firewall." However, the "object" node 525 is now expanded into a subtree: it includes a child node 526 of type "type" with a value of "port," and an additional child node 528 of type "ID" with a value of "8080." This enriched structure provides greater specificity, enabling downstream systems and human reviewers to better understand the nature of the event. The updated tree also retains a child node 530 of type "action," with a value of "blocked," consistent with the original parse tree.

Beyond structural enrichment, the updated real-time parse tree 520 includes a new branch for logging metadata, indicated by node 531. This branch includes child node 532 with a type "status" and a value of "action logged," and child node 534 with a type "jurisdiction" and a value of "cyber defense directive 20XX-04." These additions provide traceability and regulatory context, supporting compliance and auditability in mission-critical environments.

In various embodiments, the updated real-time parse tree 520 is generated by an AI agent in coordination with the MCP server, based on the initial parse tree 510 and additional contextual inputs. These inputs may be derived from system logs, historical records, machine learning inference, or other suitable sources. By applying grammar-based parsing and context-aware augmentation, disclosed embodiments can identify missing or incomplete elements, populate parse trees with enriched data, and generate updated opnotes that reflect a more complete and accurate account of operational activity. This approach enhances documentation quality in high-stakes domains such as cybersecurity, infrastructure monitoring, and emergency response.

In embodiments, the real-time parse tree includes a Concrete Syntax Tree (CST). In some embodiments, the real-time parse tree includes an Abstract Syntax Tree (AST). The Concrete Syntax Tree (CST) can be used when precise syntactic fidelity is required, such as preserving exact token order, punctuation, and formatting for downstream validation or reconstruction. CSTs have advantages in scenarios involving grammar enforcement, syntax highlighting, and round-trip editing, where the original structure must be retained. Similarly, the Abstract Syntax Tree (AST) is well-suited for use when semantic interpretation and logical structure are prioritized over surface syntax. ASTs provide advantages in tasks such as event classification, causal inference, and AI-assisted augmentation, where higher-level abstractions are more useful than raw syntax.

In some embodiments, a combination of various types of parse tree can be used, allowing the system to toggle between syntactic precision and semantic generalization depending on the operational context. Beyond CST and AST, other embodiments may further include Dependency Trees, which represent grammatical relationships between tokens; Semantic Trees, which encode meaning-based relationships and roles; and Hybrid Trees, which combine elements of CST and AST to support layered analysis. These diverse tree structures enable flexible and context-aware documentation workflows that adapt to the needs of both human operators and AI agents. The parse-trees can correspond to an opnote file structure. In embodiments, the opnotes file structure includes a field for storing a timestamp, wherein the timestamp indicates when an operational event was recorded. In some embodiments, the opnotes file structure includes a field for specifying an event type, wherein the event type is selected from a predefined set of categories including command execution, system response, and operator observation. In some embodiments, the opnotes file structure includes one or more fields for storing technical details associated with the operational event, the technical details comprising at least one of system identifiers, command parameters, output values, and contextual metadata. In embodiments, the real-time parse tree 520 can be stored as an operational notes (opnotes) file structure.

Figure 6:
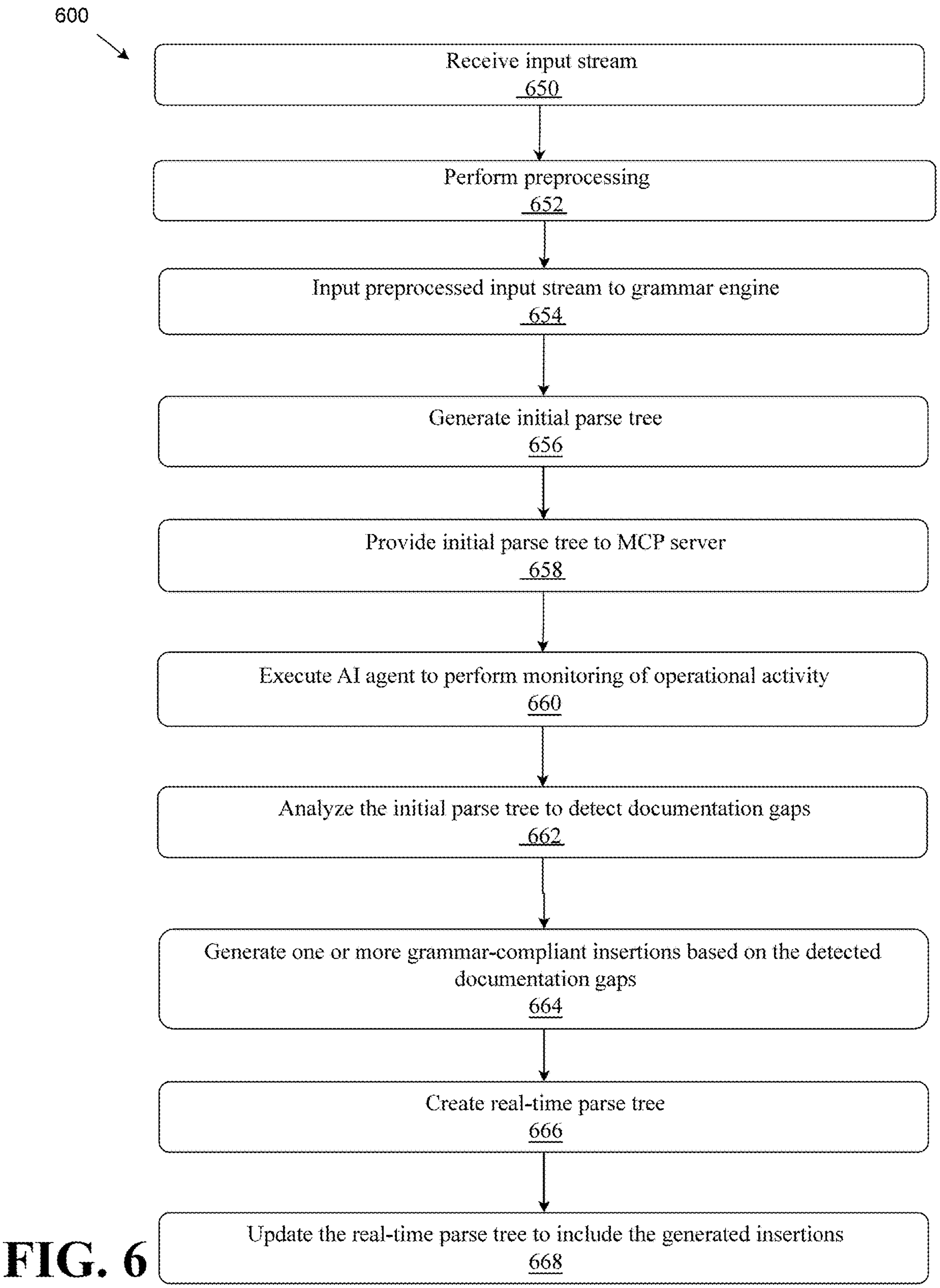
FIG. 6 is a flow diagram illustrating an exemplary method for AI-enabled recording of operational events using grammar-based parse trees and context-optimized documentation, in accordance with one or more embodiments.

FIG. 6 is a flow diagram 600 illustrating an exemplary method for AI-enabled recording of operational events using grammar-based parse trees and context-optimized documentation. The process begins at block 650, where an input stream is received. In various embodiments, the input stream may include user annotations, telemetry data from sensors, system logs, and other relevant sources. This diverse data forms the foundation for subsequent analysis and documentation.

At block 652, the input stream undergoes preprocessing. This step may include operations such as spell checking, range validation, and temporal correlation of events. These preprocessing functions help normalize and structure the data, ensuring that it is suitable for grammar-based parsing. In embodiments, the AI agent is further configured to perform automated cross-referencing between related events based on shared attributes. In embodiments, the shared attributes include at least one of timestamps, operational context, and actor identity. At block 654, the cleaned and validated input stream is provided to a grammar engine, which generates an initial parse tree at block 656. The parse tree represents a structured, hierarchical interpretation of the input, organizing elements such as actors, actions, objects, and timestamps according to predefined grammar rules.

At block 658, the initial parse tree is transmitted to an MCP server, which serves as a coordination hub for context-aware processing. At block 660, the AI agent is executed to monitor operational activity, leveraging information from one or more MCP modules. At block 662, the AI agent and/or MCP server analyze the initial parse tree to detect documentation gaps. This analysis may include techniques such as disambiguation, natural language processing, sentiment analysis, and other machine learning methods to identify missing or incomplete information that could impact the clarity or completeness of operational records.

Once documentation gaps are identified, block 664 initiates the generation of grammar-compliant insertions to address those gaps. At block 666, a real-time parse tree is created, and at block 668, the tree is updated to incorporate the newly generated insertions. In some embodiments, a human operator may act as a gatekeeper, reviewing proposed additions via an opnote validation interface, to accept, reject, or modify entries before finalizing the opnotes. This human-in-the-loop mechanism ensures that AI-assisted documentation remains accurate, accountable, and aligned with operational realities.

Figure 7:
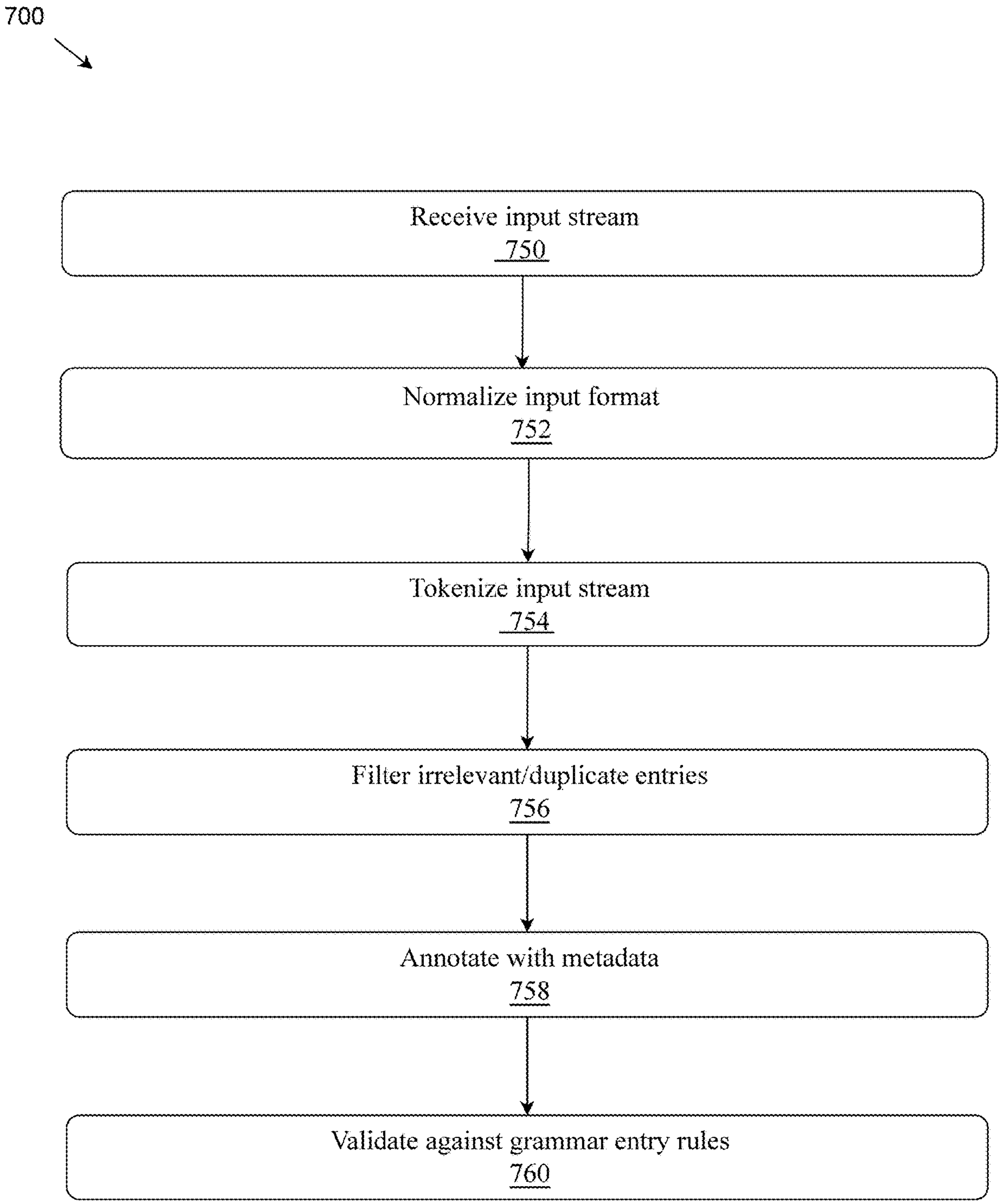
FIG. 7 is a flow diagram illustrating preprocessing of the input stream, in accordance with one or more embodiments.

FIG. 7 is a flow diagram 700 illustrating preprocessing of the input stream, in accordance with one or more embodiments. At block 750, an input stream is received. The input stream may include user-generated input, such as typed annotations or voice-to-text entries, along with telemetry data from sensors, system logs, and/or automated surveillance systems. In some embodiments, the input stream may be encrypted using fast symmetric encryption algorithms, with asymmetric encryption employed for secure conveyance of keys, certificates, and other associated credentials. This ensures confidentiality and integrity of sensitive operational data during transmission and processing.

At block 752, the input format is normalized. This can include converting disparate data formats into a unified schema, resolving encoding inconsistencies, standardizing timestamp formats, and/or harmonizing field labels across different sources. Normalization may also involve aligning terminology to a controlled vocabulary or domain-specific ontology, thereby improving downstream parsing accuracy. At block 754, the normalized input stream is tokenized. Tokenization may include identifying parts of speech, segmenting sentences, and separating tokens based on temporal arrival, semantic category, and/or source type. This structured breakdown facilitates grammar-based parsing and contextual analysis.

At block 756, duplicate and/or irrelevant entries are removed. This filtering step reduces noise in the data and minimizes unnecessary computational overhead for the AI agent, allowing system resources to focus on meaningful content. At block 758, the remaining information is annotated with metadata. Metadata may include timestamps, geolocation data, environmental conditions, operator identity, and/or situational context. These annotations enrich the input stream and support traceability, compliance, and auditability. Finally, at block 760, the data is validated against grammar entry rules. This validation may include checking for required fields, enforcing syntactic constraints, verifying semantic coherence, and/or ensuring compatibility with downstream parse tree generation. In this way, disclosed embodiments ensure that only well-formed, contextually relevant data proceeds to the next stage of processing.

Figure 8:
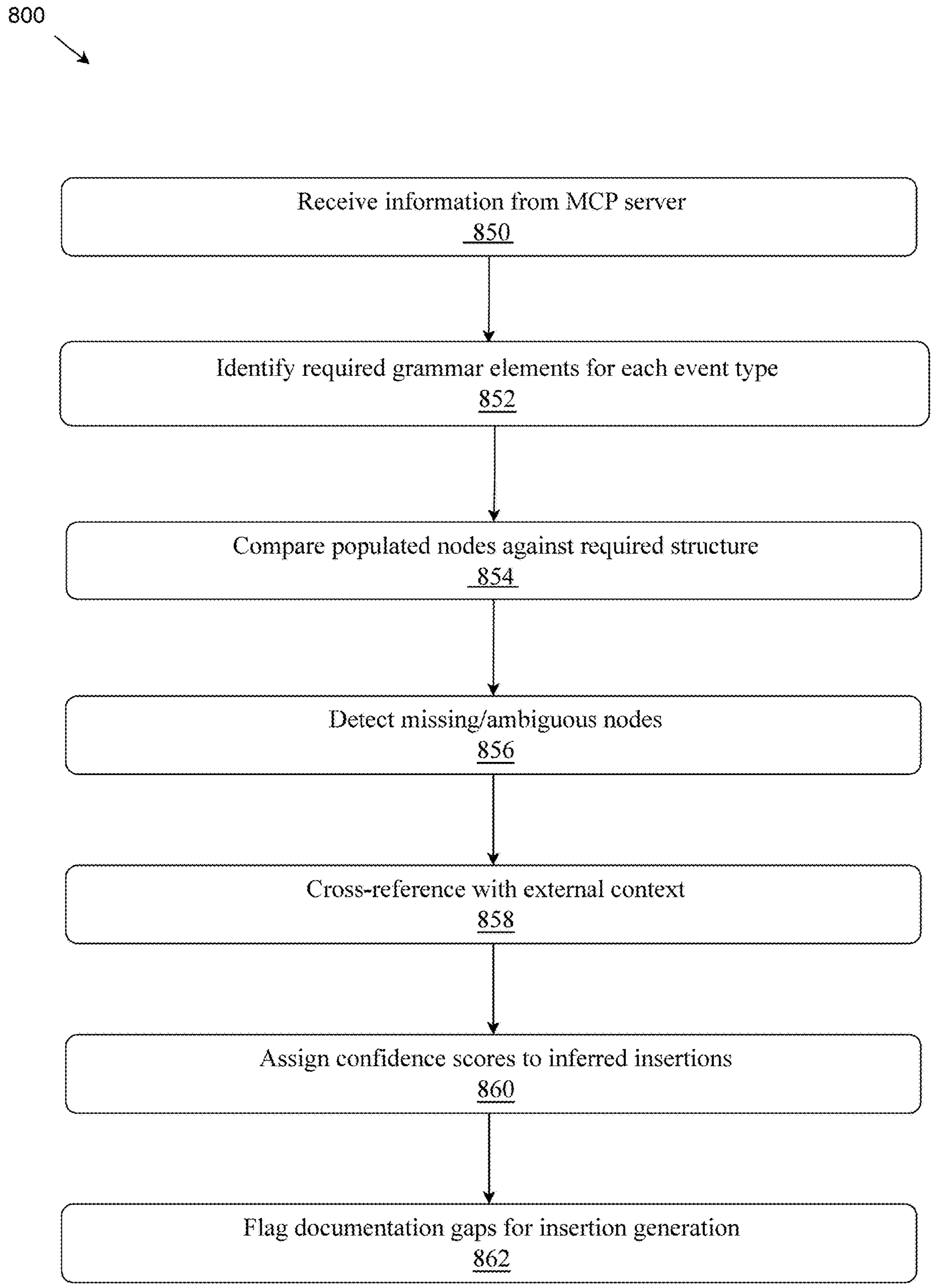
FIG. 8 is a flow diagram illustrating AI agent analysis of an initial parse tree for detecting documentation gaps, in accordance with one or more embodiments.

FIG. 8 is a flow diagram 800 illustrating AI agent analysis of an initial parse tree for detecting documentation gaps. The process begins at block 850 where the MCP server provides a subset of the initial parse tree or selected child branches to the AI agent for focused analysis. At block 852 the AI agent identifies the set of required grammar elements for the event type under review, such as object, action, actor, status, and/or jurisdiction. At block 854 populated notes are evaluated against the required structure defined by the grammar engine. Where a node is inapplicable the agent invokes a pruning routine to remove or collapse the irrelevant branch, thereby simplifying the parse tree and reducing consumption of compute resources such as memory, processing cycles, and network bandwidth.

At block 856 the AI agent detects missing or ambiguous nodes by locating required nodes that are empty, null, or semantically underspecified. Detected gaps are classified by type, for example missing identifier, missing timestamp, ambiguous actor, or incomplete rationale. At block 858 the agent cross-references external context sources to resolve gaps, including system logs, firewall records, network traffic captures, historical opnotes in the opnotes corpus, and/or related telemetry. Cross-referencing yields candidate supplemental values such as a specific port number, an inferred actor identity, or a corroborating timestamp.

At block 860 the AI agent assigns a confidence score to each candidate insertion. Confidence scores can be computed using an ensemble of evidence signals including model-based likelihoods from one or more machine learning classifiers, statistical correlations from log analysis, provenance and/or source reliability weights, and calibration factors derived from historical operator accept/reject outcomes. The scoring process incorporates metadata such as timestamp alignment, source trust level, and/or consistency with recent events to produce a calibrated probability that a candidate insertion is correct.

At block 862 candidate insertions are flagged for generation. In embodiments, candidate insertions are flagged only when their confidence score exceeds a predetermined threshold. In embodiments, candidates below the threshold may be queued for human review, used to prompt follow-up data collection, or discarded. Flagged insertions are formatted as grammar-compliant insertions and returned to the MCP server for downstream processing, which can include automatic integration into an updated parse tree and/or presentation to an operator via the opnote validation interface for accept, edit, or reject actions. This pipeline balances automated augmentation with conservatism to minimize erroneous documentation while preserving efficiency and traceability.

As can now be appreciated, disclosed embodiments can provide systems and methods for annotating existing information and supplementing missing details in operational note (opnote) documents. By leveraging grammar-based parse trees, AI-assisted context analysis, and human-in-the-loop validation, the system ensures that operational records are both comprehensive and trustworthy. This approach improves situational awareness, supports post-operation review, and reduces the burden on human operators by automating the detection and resolution of documentation gaps. Thus, disclosed embodiments go beyond providing relief for immediate operational burdens, and also create structured data assets that improve long-term analysis, compliance, and institutional knowledge retention.

It will be understood that the foregoing use case examples are presented for illustrative purposes only and are not intended to be limiting. The examples demonstrate how disclosed embodiments may operate in coordination with base system components to annotate existing operational data, identify documentation gaps, and generate enriched opnotes using grammar-based parse trees and AI-assisted context analysis. However, the systems and methods described herein are broadly applicable across a wide range of operational domains, including cybersecurity, infrastructure monitoring, emergency response, and mission-critical logistics.

Other non-limiting use case examples may include documenting coordinated incident response across distributed teams, supplementing sparse field reports with inferred environmental context, enriching security logs with actor attribution and jurisdictional metadata, and/or reconstructing operational timelines from fragmented telemetry and human annotations. In each case, disclosed embodiments may ingest structured and unstructured inputs, normalize and tokenize the data, generate initial parse trees, and apply context-aware augmentation to produce comprehensive and trustworthy documentation. The resulting opnotes may support real-time decision-making, post-operation review, compliance auditing, and long-term trend analysis.

In some embodiments, the system may further incorporate predictive annotation capabilities, enabling the AI agent to anticipate likely next events based on historical patterns and propose pre-filled entries. This reduces latency in record-keeping and improves continuity across operational phases. Additionally, multi-agent collaboration may be employed, with specialized AI agents handling technical telemetry, narrative summaries, or compliance tagging in parallel.

Coordination among these agents enhances coverage and efficiency while preserving semantic integrity.

Disclosed embodiments may also support integration with external data streams, such as video feeds, RF signals, or sensor outputs, allowing environmental context to be fused directly into the grammar-defined record. Privacy and security layers may be applied to restrict visibility of sensitive nodes, while adaptive grammar evolution ensures that the documentation structure remains aligned with evolving operational practices. In this way, disclosed embodiments can provide a scalable, extensible framework for intelligent documentation that adapts to the needs of both human operators and automated systems.

Accordingly, the scope of the present disclosure should not be limited to the particular implementations, workflows, or domain-specific examples described herein. Variations in system topology, data source integration, modeling techniques, operational roles, deployment environments, and user interface design are considered within the scope of the inventive concepts. Functional subsystems may be embodied in software, hardware, firmware, or any combination thereof, and may be deployed centrally, at the edge, or in hybrid configurations adapted to mission or organizational requirements. The claims are intended to cover all such modifications, equivalents, and variations as fall within the spirit and scope of the appended claims.

In various embodiments, the grammar-derived parse tree is not directly exposed to the AI agent during operation of the system illustrated in FIG. 8. Instead, the parse tree and its associated structural invariants are encapsulated behind a MCP interface that presents a compact set of typed intents and resource-bounded affordances (e.g., "classify event," "propose field values," "request subtree mutation," "validate against schema", etc.). By mediating access in this manner, the MCP interface transforms the agent's free-form proposals into constrained, schema-aware requests that the orchestration layer (e.g., AI Agent 150) can deterministically accept, adapt, or reject. This encapsulation reduces cognitive and computational load on the agent by abstracting away low-level node/edge details, breadth and depth of the tree, and intermediate normalization steps that would otherwise tax the agent's context window and reasoning capacity.

In some embodiments, the MCP interface maintains a stable contract that includes method signatures, preconditions, postconditions, and error semantics, but omits the internal tree representation and traversal state. The interface can further advertise only the next valid actions given the current document state and policy, thereby bounding the agent's branching factor and minimizing invalid or non-conforming edits. When the agent proposes an action that violates grammar constraints, data-type requirements, or organizational policy, the MCP server may return a structured refusal with machine-readable diagnostics and a shortlist of allowable alternatives, enabling iterative correction without revealing underlying tree topology.

In certain implementations, the MCP server also manages context compaction and summarization on behalf of the agent by packaging just the minimally sufficient cues (e.g., field stubs, schema excerpts, and localized diffs) required to produce useful outputs, while retaining full-fidelity structures internally for validation, reconciliation, and ledger synchronization. This separation of concerns improves robustness against prompt-level errors and injection attempts, permits deterministic enforcement of documentation rules, and enables the system to evolve the internal grammar and tree storage format without requiring changes to the agent prompts or behavior. Optionally, a privileged, human-operator view may render the parse tree for auditing and debugging, while the agent continues to interact exclusively through the MCP interface.

In various embodiments, FIG. 8 supports an architecture in which an AI agent interfaces with an MCP server that encapsulates the grammar-derived parse tree for an operational note. The agent does not obtain or traverse the internal tree structure; rather, it invokes typed MCP tools—such as classify event, propose field values, request constrained mutation, or validate against schema—that the MCP server maps to deterministic tree operations. Each tool declares parameter types, preconditions, postconditions, and error semantics. When a requested action would violate grammar constraints, data-type requirements, or organizational policy, the MCP server returns a structured refusal containing machine-readable diagnostics and a shortlist of permissible alternatives. In this way, the MCP server functions as a policy- and schema-aware mediation layer while the agent remains oblivious to node/edge topology, traversal state, or normalization routines.

In some implementations, the MCP server also performs context compaction on behalf of the agent by surfacing only the minimally sufficient cues (for example, field stubs, schema excerpts, localized diffs, and validation hints) required to complete the next action. The server may expose read-only resources that summarize current document state and prior decisions without revealing the full parse tree. Tool invocations that succeed commit deterministic edits to the underlying structure and can emit audit records for downstream synchronization or ledgering. Optionally, a privileged human operator view can render the internal tree for debugging and compliance review, while the agent continues to operate strictly through the MCP interface. This separation of concerns reduces cognitive and computational load on the agent, yields predictable and auditable outcomes, and permits the internal grammar and storage format to evolve without changing agent prompts or behavior.

Figure 9:
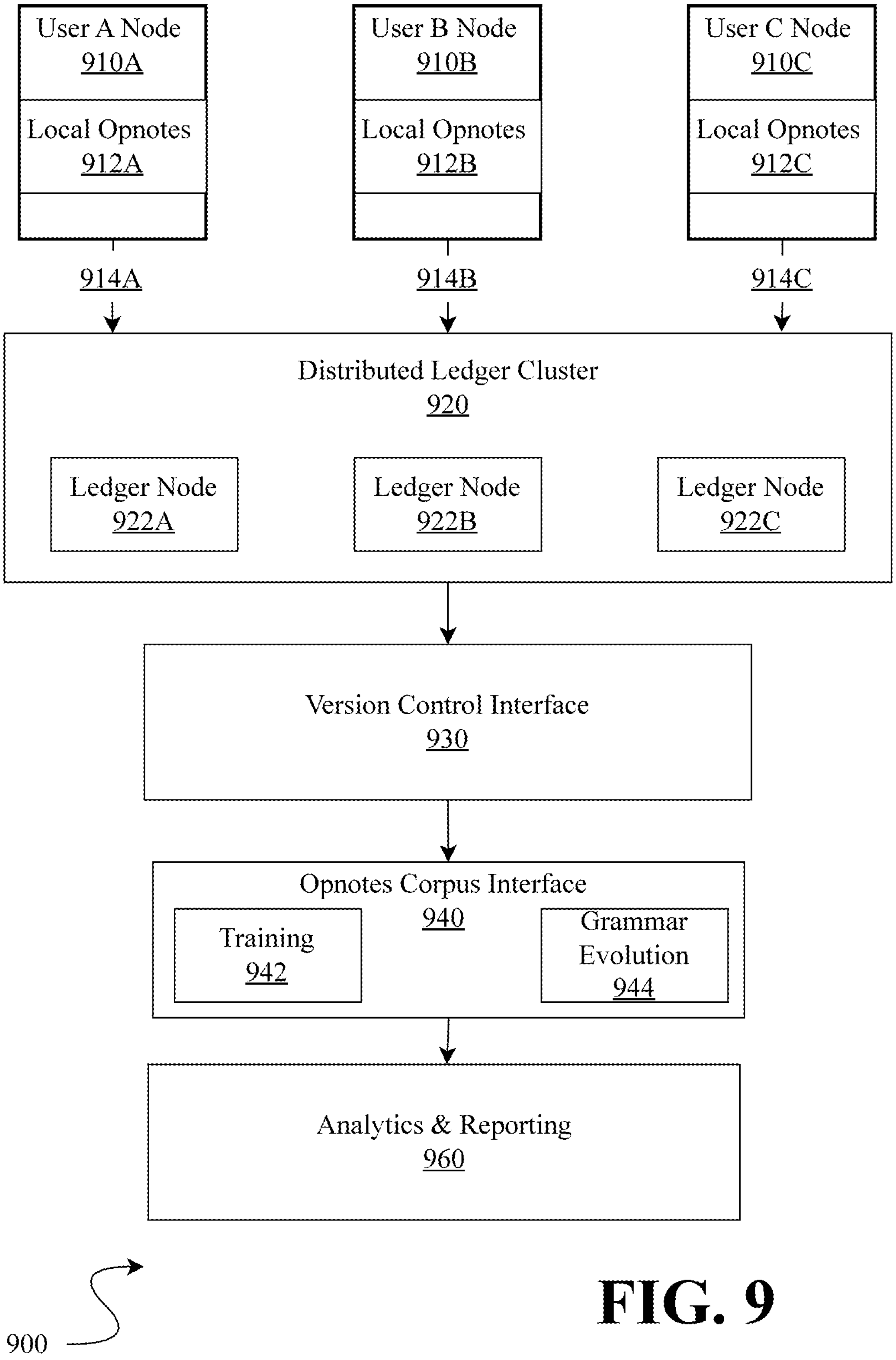
FIG. 9 is a block diagram illustrating an exemplary architecture for distributed multi-user synchronization and ledger-based management of operational documentation, according to an embodiment.

FIG. 9 is a block diagram illustrating an exemplary architecture for distributed multi-user synchronization and ledger-based management of operational documentation, referred to herein as the Opnotes Corpus Ledger 900. The architecture enables multiple analysts or operator nodes to collaboratively generate, modify, and validate operational notes in real time while maintaining cryptographic integrity, version control, and comprehensive auditability across a secure distributed network.

As shown in FIG. 9, three representative analyst nodes 910*a-c* are depicted to demonstrate concurrent multi-user operation, although any number of nodes may participate in practice. Each node corresponds to an operator terminal executing a local instance of an opnotes client application, represented by local opnotes instances 912*a*-912*c*. These local instances cache operational documentation entries created or edited by individual users, such as red-team operators, incident responders, and threat-hunting analysts. Each local instance maintains temporary state information including unsynchronized edits, session identifiers, and user-specific cryptographic keys.

Each analyst node 910*a*-910*c* communicates with a distributed ledger cluster 920 via synchronization channels 914*a-c* that implement and pull operations. A commit operation transmits locally validated entries from a user node to the distributed ledger for consensus verification, while a pull operation retrieves the most recent committed state from the ledger to refresh the analyst's local copy. These synchronization operations are authenticated through digital signatures and transport-layer encryption to ensure confidentiality and non-repudiation.

The distributed ledger cluster 920 comprises a plurality of redundant ledger nodes 922*a*-922*c* interconnected by consensus propagation links. Each ledger node maintains an immutable record of operational entries organized into sequentially hashed blocks, each block containing timestamps, contributor identifiers, and hash references to preceding blocks. Consensus propagation ensures that all ledger nodes replicate the same canonical state through Byzantine-fault-tolerant or proof-of-authority protocols. This decentralized replication mitigates the risk of single-point failure and guarantees data integrity even under partial network compromise.

Within the ledger cluster 920, a conflict-resolution may continuously monitor for concurrent edits or branch divergences submitted by multiple users. When identical or overlapping parse-tree segments are modified simultaneously, the conflict-resolution engine computes a deterministic merge outcome by comparing version timestamps, user priority weights, and semantic deltas derived from the underlying grammar tree. This may automatically reconcile non-conflicting changes while flagging ambiguous cases for operator review through the validation interface.

Validated ledger entries are exported through a version control interface 930, which provides translation between the distributed ledger's block-structured format and higher-level version-control semantics such as branching, merging, rollback, and differential comparison. The interface 930 may implement APIs compatible with common version-control workflows, enabling developers or analysts to view opnote revisions, generate diffs, and restore prior states. The interface further attaches provenance metadata including commit identifiers, operator credentials, and digital signature verification results.

Downstream of the version-control interface 930, an Opnotes Corpus Interface 940 manages ingestion of validated documentation into persistent long-term storage. The corpus interface 940 may write to an enterprise database, secure data lake, or other repository corresponding to the Opnotes Corpus (180, as previously described). Embedded within the corpus interface are two key subsystems: a Training Module 942 and a Grammar Evolution Module 944. The training module 942 utilizes historical commit records and human-validation outcomes to refine machine-learning models used for confidence scoring and gap detection in subsequent AI agents. The grammar-evolution module 944 performs statistical analysis of accepted document structures to adapt parsing rules, extend recognized event ontologies, and optimize syntactic efficiency for future operational contexts.

All communication among user nodes 910*a*-910*c*, ledger nodes 922*a*-922*c*, and downstream interfaces occur within a secure network environment. The secure network may employ end-to-end encryption, mutual authentication, and network segmentation to prevent unauthorized access. The environment may be implemented as a virtual private cloud or a zero-trust enclave, ensuring that ledger consensus traffic and corpus updates are isolated from general enterprise networks.

An analytics and reporting module 960 interfaces with the corpus interface 940 to generate near-real-time operational intelligence products. The analytics module may compute metrics such as synchronization latency across nodes, completeness scores indicating the proportion of operational phases documented, and anomaly-density distributions measuring the frequency of divergent entries. The module 960 may further produce compliance and audit reports demonstrating adherence to documentation policies and security standards.

Through this distributed design, the architecture 900 ensures that all participating analysts share a consistent and verifiable operational picture without relying on centralized databases. Each entry within the ledger is immutable once validated, providing a tamper-evident audit trail suitable for forensics, accreditation, and regulatory compliance. The integration of version control 930 and grammar-evolution 944 mechanisms provides continuous self-improvement and knowledge retention across multiple operational campaigns.

Figure 10:
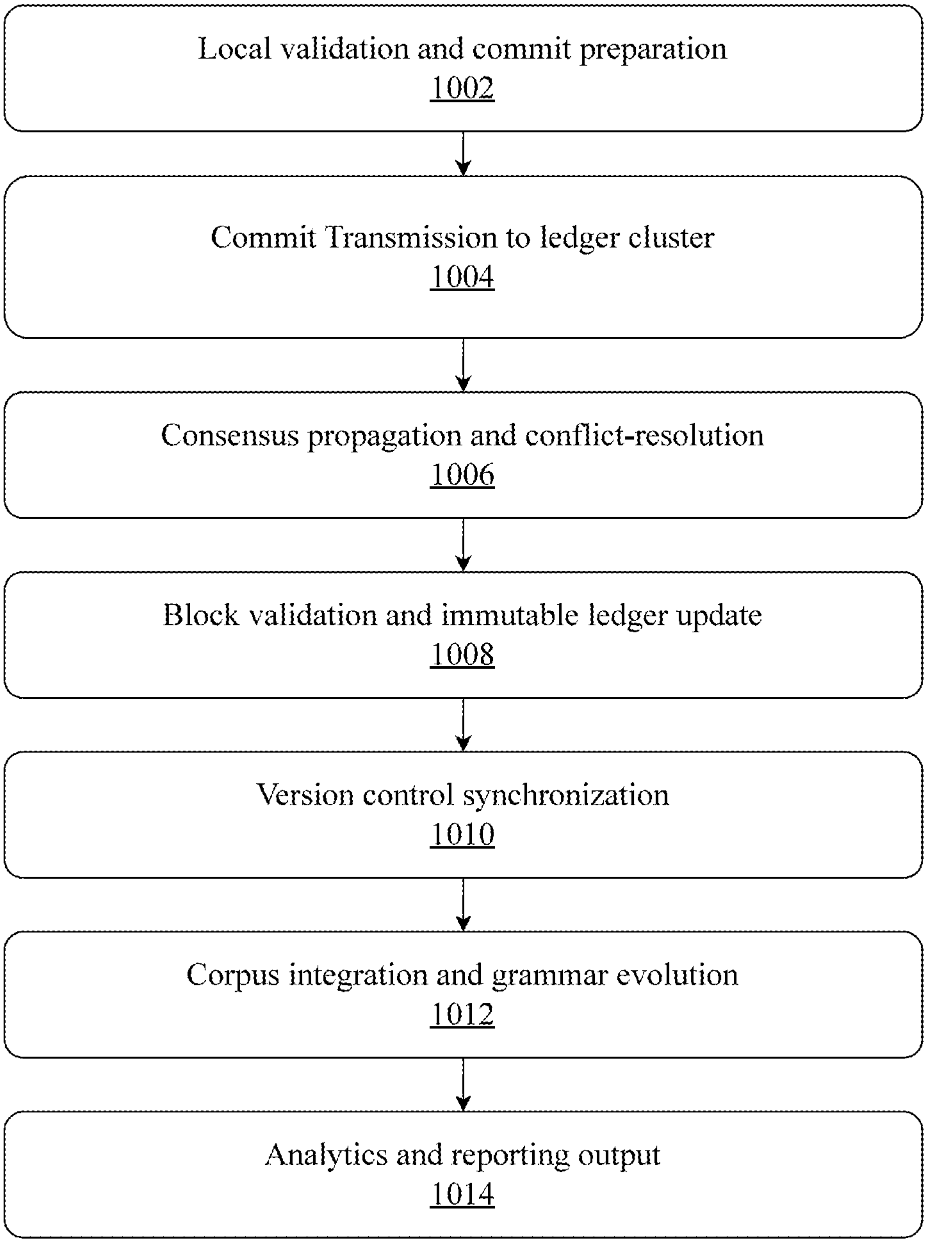
FIG. 10 is a flow diagram illustrating an exemplary method for the distributed multi-user synchronization and ledger-based documentation management within the system architecture, according to an embodiment.

FIG. 10 is a flow diagram illustrating an exemplary method for distributed multi-user synchronization and ledger-based documentation management within the system architecture. The method ensures that multiple geographically dispersed analysts can collaboratively maintain an authoritative, cryptographically verifiable record of operational notes (opnotes) while preserving concurrency control, data integrity, and audit transparency.

At step 1002, the process begins when one or more operators (e.g., red-team analysts, threat-hunting personnel, or incident responders) generate or modify local operational notes using their respective client terminals, corresponding to nodes 910*a*-910*c* in FIG. 9. Each local instance 912*a*-912*c* executes a documentation client that captures analyst inputs, such as textual observations, command-line transcripts, detected anomalies, and remediation steps. As operators enter data, the client application automatically applies domain-specific grammar validation to ensure syntactic conformity with a predefined opnote schema (e.g., actor-action-object-timestamp-jurisdiction). Each entry is automatically timestamped, tagged with an operator identifier, and associated with the relevant operational campaign. Each client performs local validation and commit preparation. This involves verifying that required grammar fields are populated, ensuring internal semantic coherence, and hashing the proposed modification to create a digital fingerprint representing the change set. The validation routine may include anomaly detection to flag malformed syntax or incomplete event structures. Once validated, the update is encapsulated into a commit payload containing the hashed content, metadata headers, and cryptographic signature generated using the operator's private key. The commit payload also embeds a parent reference pointer, linking the update to the immediately preceding ledger state known to the client, thereby preserving linear revision history.

At step 1004, the commit payload is transmitted to a distributed ledger cluster 920 via the secure communication channels 914*a*-914*c*. Each payload is queued by a receiving ledger node (e.g., 922*a*) and broadcast to peer nodes 922*b*-922*c* through consensus propagation links. During this broadcast, each ledger node performs an independent validation of the payload, verifying the cryptographic signature, timestamp freshness, and parent-hash integrity. If any node identifies an inconsistency or hash mismatch, it rejects the block and issues a remediation request back to the originating client for re-submission. Valid payloads are aggregated into a proposed block for consensus evaluation.

At step 1006, the distributed ledger cluster executes a consensus propagation and conflict-resolution process. Ledger nodes exchange proposed blocks and perform deterministic comparison operations to identify concurrent submissions affecting the same parse-tree region or semantic entity. Conflict-Resolution computes a merge outcome by evaluating several criteria: timestamp precedence, contributor confidence weights derived from role hierarchy, and semantic deltas between node structures. When two updates modify non-overlapping branches of the parse tree, the engine merges them automatically; when overlap occurs, the engine generates a composite candidate block and submits it for human review via the validation interface. Upon reaching quorum (e.g., 2-of-3 or 3-of-5 agreement, depending on configuration), the finalized block is cryptographically sealed and appended to the ledger chain, creating a tamper-evident record.

At step 1008, the ledger's confirmed block sequence becomes the canonical documentation state. The block, containing multiple validated opnote entries, is then exposed through the Version Control Interface 1010. In this step 1010, the interface translates ledger transactions into higher-level revision-control constructs such as branches, merges, and rollback checkpoints. The interface automatically generates globally unique revision identifiers and cross-references them to operator credentials and timestamps. Through this mechanism, each change is traceable to its originator, enabling investigators to reconstruct documentation lineage with full provenance metadata.

At step 1012, the validated data propagates through the Opnotes Corpus Interface 940 into long-term persistent storage. This corpus may reside on redundant database clusters, versioned object stores, or blockchain-anchored archives. During ingestion, the corpus interface normalizes all incoming entries, reconciles cross-references to related incidents, and indexes fields such as event type, system identifier, and contextual tags. The training module leverages historical commit data, including operator accept/reject decisions from validation workflows, to continuously fine-tune the machine-learning classifiers used in the AI agent's gap-detection and confidence-scoring subsystems. The grammar-evolution module performs statistical analysis across the corpus to identify recurring syntactic structures, emergent event types, and semantic drift, dynamically updating parsing rules to ensure continued alignment with operational reality.

At step 1014, the system executes analytics and reporting operations through module 960. As the corpus evolves, analytics engines compute documentation-completeness scores quantifying how thoroughly each operational phase was captured, latency metrics reflecting synchronization delay between ledger commits, and anomaly-density statistics indicating the proportion of entries flagged for correction. These outputs are visualized in dashboards and can trigger automated compliance reports demonstrating adherence to regulatory or internal quality standards. Optionally, causal-chain analysis reconstructs incident timelines by linking initial intrusion events to subsequent remediation actions, supporting forensic review and after-action reporting.

In some embodiments, the process includes a continuous feedback loop in which analytics insights and grammar-evolution results are relayed back to the grammar engine and AI agent described in FIGS. 2-8. This closed-loop architecture ensures that operational documentation becomes progressively more accurate, context-aware, and semantically rich over time, while maintaining formal consistency through grammar-based constraints and verified ledger synchronization.

The described sequence thus provides a fully enabled implementation for real-time, distributed documentation management in high-tempo cyber-operations environments. Unlike conventional systems relying on centralized databases or unverified log aggregation, the disclosed method ensures immutable provenance of every record through cryptographic consensus, supports concurrent editing through deterministic conflict-resolution algorithms, and achieves continuous improvement through integrated training and grammar-evolution pipelines. The result is a verifiable, auditable, and self-adapting documentation framework that harmonizes automation with human oversight while preserving operational integrity across distributed teams.

Figure 11:
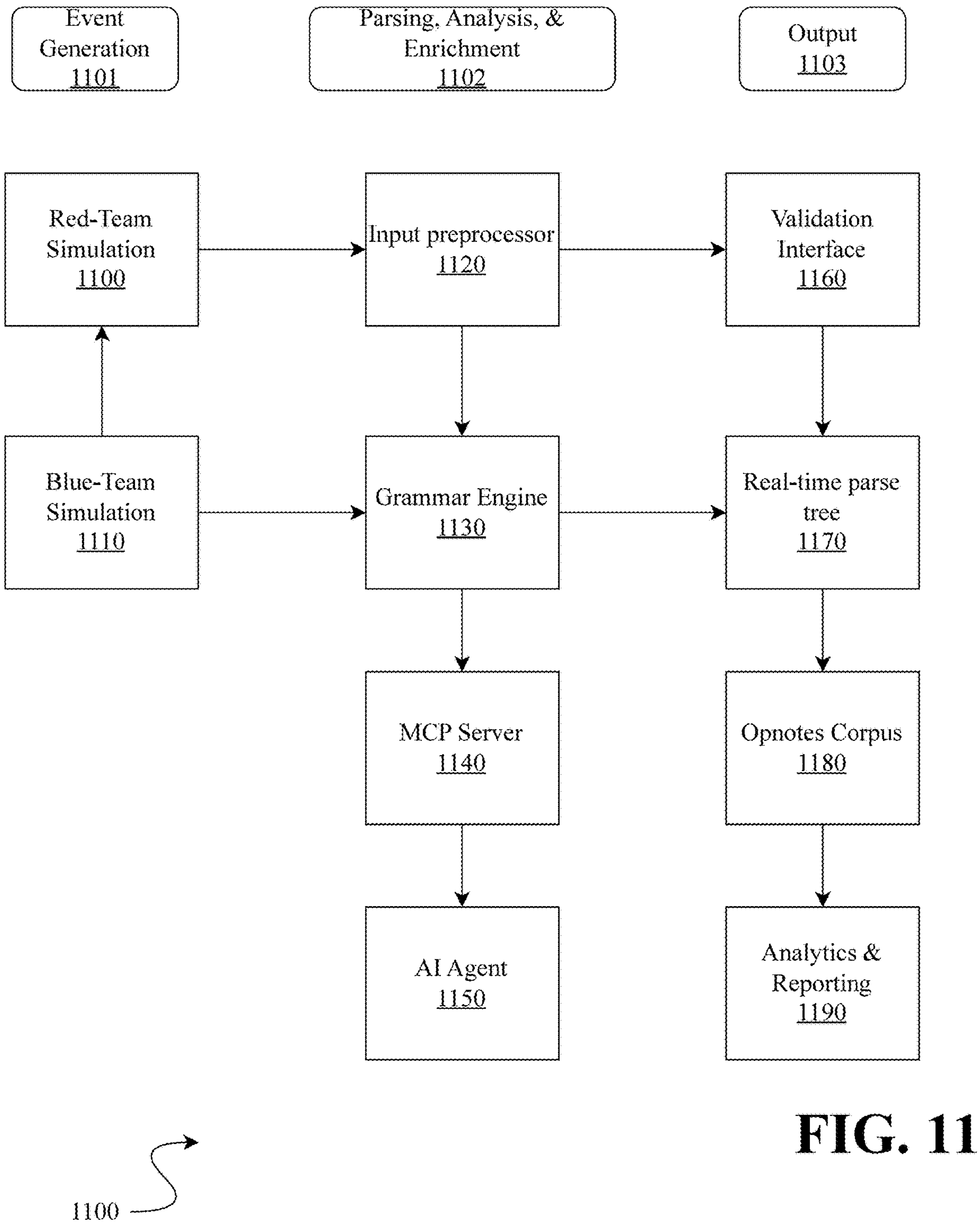
FIG. 11 is an exemplary data flow for cyber-operations documentation, depicting how simulated adversarial events and defensive telemetry traverse the grammar-based parsing, according to an embodiment.

FIG. 11 is a flow diagram of an exemplary data flow 1100 for cyber-operations documentation, depicting how simulated adversarial events and defensive telemetry traverse the grammar-based parsing, Model Context Protocol (MCP) orchestration, AI reasoning, and validation pipeline to produce structured, context-optimized operational records. FIG. 11 demonstrates how the disclosed system processes tangible machine-generated signals rather than abstract linguistic content, grounding the claimed subject matter in real cybersecurity telemetry.

This begins with event generation 1101. Red-Team Simulation Module 1100 and Blue-Team Response Module 1110 collectively generate the multi-modal event streams ingested by the system. Red-Team Module 1100 emulates adversarial behavior consistent with established frameworks such as MITRE ATT&CK, producing telemetry that includes network intrusion attempts, phishing payload deliveries, privilege-escalation chains, lateral movement traces, and exfiltration events. The module may run on virtualized test networks, containerized penetration-testing environments, or dedicated cyber-range infrastructures. Each simulated event is logged with a timestamp, source and destination IP addresses, associated process identifiers, and command-execution metadata.

Concurrently, Blue-Team Response Module 1110 captures the defensive side of the engagement. This includes intrusion-detection and prevention system (IDS/IPS) alerts, firewall connection logs, endpoint-detection telemetry, authentication failures, network-sensor packet captures, and human-authored SOC analyst notes describing mitigation and containment activities. These datasets originate from distinct sensors with heterogeneous formats such as JSON, syslog, CSV, and proprietary binary structures, creating the need for the normalization pipeline described below within the parsing, analysis, and enrichment phase 1102.

The incoming data feeds converge at an input preprocessor 1120, which serves as the ingestion and normalization layer of the system. The preprocessor performs multi-stage transformation: (i) format normalization to unify differing schemas; (ii) timestamp harmonization across devices with independent clocks, leveraging network-time-protocol corrections; (iii) deduplication using content-hash comparison; (iv) semantic tokenization to segment continuous log streams into discrete atomic events; and (v) metadata enrichment. The enrichment operation appends contextual tags such as sensor origin, operator role, confidence level, network segment, and geolocation of the endpoint. The preprocessor further applies encryption at rest using symmetric algorithms (e.g., AES-256) and employs asymmetric key exchange for secure credential management, ensuring confidentiality during intermediate storage and transmission. The result is a unified, semantically annotated input stream ready for grammatical analysis.

The normalized stream is then processed by a grammar engine 1130, which converts the heterogeneous telemetry into a structured syntactic representation known as an Initial Parse Tree. The grammar engine operates under a formal grammar expressed in Backus-Naur Form or equivalent notation, organizing each event into canonical roles such as actor, action, object, timestamp, status, and jurisdiction. The engine detects missing or underspecified nodes, such as absent actor identifiers or incomplete time ranges, and flags them for downstream augmentation. It also computes structural consistency metrics and attaches parse-tree confidence scores reflecting syntactic fidelity. The initial parse tree is transmitted to the model context protocol (MCP) server 1140, which coordinates specialized analytical modules. These modules provide domain-specific reasoning layers that enhance situational understanding: the threat correlation module aggregates related events across hosts, users, and network boundaries to identify coordinated attack campaigns. It computes similarity vectors for indicators such as hash values, IP adjacency, and temporal correlation windows, outputting clustered threat entities. The vulnerability linker module associates observed exploitation attempts with external vulnerability databases such as CVE and NVD. It retrieves CVSS severity scores, patch availability, and remediation recommendations, enriching the parse tree with actionable vulnerability context. The incident replay module reconstructs attack sequences by simulating the temporal and causal order of events. It can emulate adversary tactics to verify detection coverage or replay defense responses for training and forensic review. The MCP server performs selective context exposure by analyzing relevance thresholds, asset criticality, and operator authorization, ensuring that only the necessary subtrees are passed downstream to conserve computational resources and maintain operational security.

The refined subtree is analyzed by AI Agent 1150 that performs context-aware documentation augmentation. The agent comprises three subsystems: a Gap-Detection Subsystem that identifies incomplete grammatical nodes; a Grammar-Compliant Insertion Generator that proposes candidate insertions; and a Confidence-Scoring Subsystem that quantifies the reliability of each proposed insertion. The agent references historical opnotes, network-traffic archives, and firewall configurations to infer missing entities such as command parameters, actor identities, or exploited ports. It assigns probability distributions to each hypothesis using ensemble models trained on historical incident data, then outputs candidate augmentations tagged with explanatory metadata and reasoning provenance.

At the output stage 1103, proposed augmentations are reviewed through a validation interface 1160, which enforces human-in-the-loop oversight. The interface presents each insertion with its confidence score, associated evidence, and provenance trace. Analysts can accept accurate suggestions, edit partial ones, reject false positives, or redact sensitive information prior to ledger submission. All operator interactions are digitally signed, time-stamped, and recorded in an audit log to ensure traceability. The interface supports batch review for high-volume event processing and may integrate with security-information-and-event-management (SIEM) dashboards for contextual visualization.

Accepted updates are committed into a real-time parse tree 1170, which maintains the authoritative operational documentation state. The real-time parse tree is synchronized across distributed users using the ledger and version-control protocols described in FIG. 9. Each validated insertion is assigned a block identifier and propagated through the consensus mechanism to ensure immutability. The parse tree thus becomes a live, evolving representation of cyber-operations activity, continuously refined by both AI inference and human judgment.

The synchronized tree and its derivatives are archived in an Opnotes Corpus 1180, which acts as the persistent historical repository for finalized operational records. Within this corpus, a Training Subsystem retrains the AI models based on accumulated human validation data, adjusting weighting parameters to reduce future error rates, while a Grammar Evolution Subsystem performs statistical grammar optimization. The evolution process identifies emerging terminology, new attack categories, and novel event correlations, updating rule sets accordingly to preserve parsing accuracy as the cyber threat landscape changes.

Finally, this feeds into an analytics and reporting Module 1190 that produces operational intelligence outputs. These include documentation-completeness indices measuring coverage across incident phases; temporal-latency metrics indicating synchronization delay between event occurrence and documentation; anomaly-density maps showing the frequency of low-confidence insertions; and causal-chain reconstructions linking initial intrusion vectors to remediation outcomes. The analytics module may further generate compliance dashboards demonstrating adherence to documentation policies and security frameworks such as NIST 800-53 or ISO 27035.

Through the interactions of modules 1100-1190, the architecture provides a tangible end-to-end workflow that converts real or simulated cyber events into structured, validated records with traceable provenance. The process leverages concrete computing components—network sensors, parsing engines, machine-learning models, distributed ledgers, and user interfaces—to achieve a technical improvement in the accuracy, consistency, and auditability of operational documentation. Thus, FIG. 11 exemplifies the cyber-specific embodiment of the disclosed invention, demonstrating the transformation of live network data into grammar-enforced, context-optimized documentation within a verifiable multi-user system.

Figure 12:
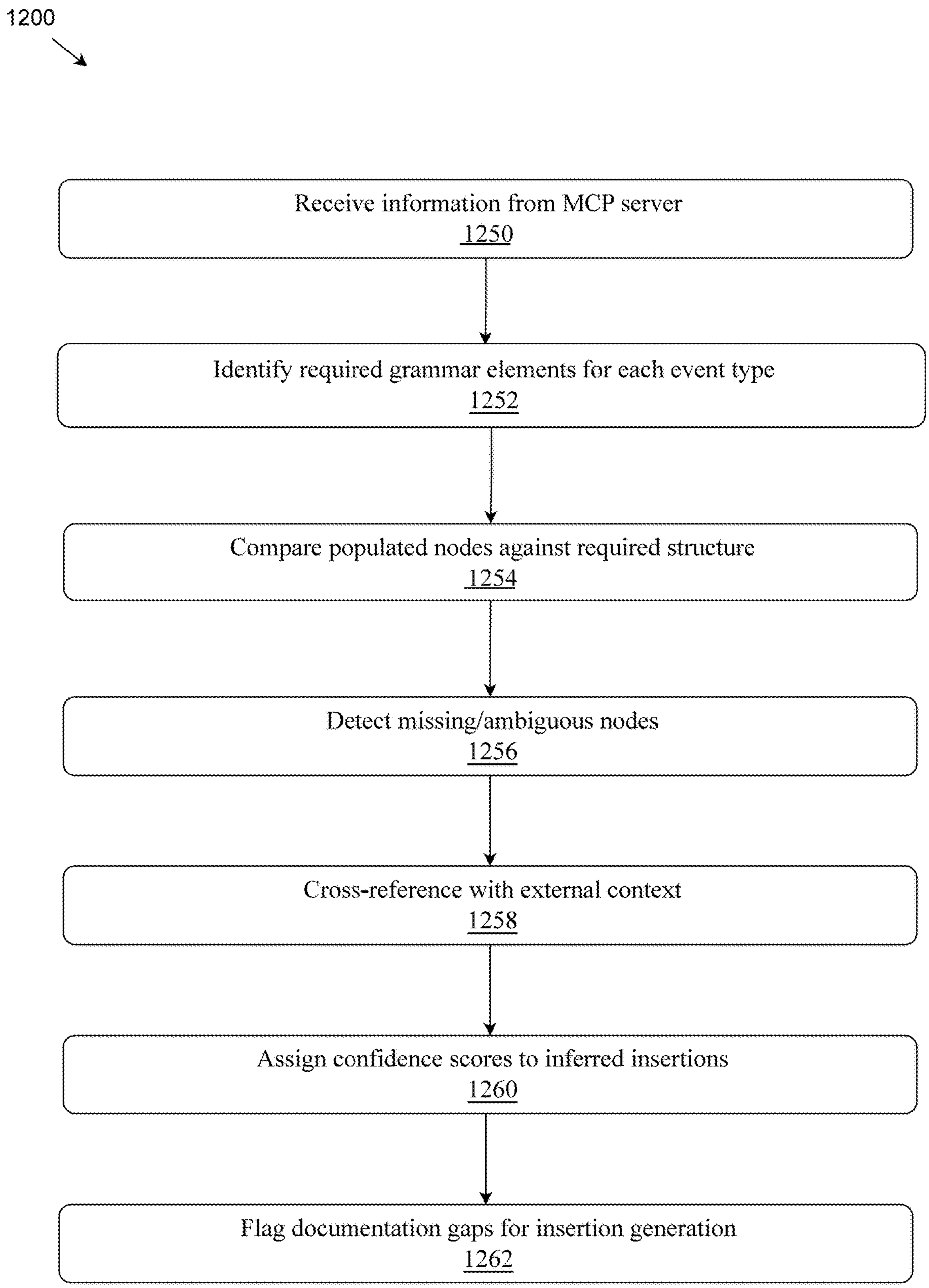
FIG. 12 is a flow diagram illustrating AI agent analysis of an initial parse tree for detecting documentation gaps, according to an embodiment.

FIG. 12 is a flow diagram 1200 illustrating AI agent analysis of an initial parse tree for detecting documentation gaps. The process begins at block 1250 where the MCP server provides a subset of the initial parse tree or selected child branches to the AI agent for focused analysis. At block 1252 the AI agent identifies the set of required grammar elements for the event type under review, such as object, action, actor, status, and/or jurisdiction. At block 1254 populated notes are evaluated against the required structure defined by the grammar engine. Where a node is inapplicable the agent invokes a pruning routine to remove or collapse the irrelevant branch, thereby simplifying the parse tree and reducing consumption of compute resources such as memory, processing cycles, and network bandwidth.

At block 1256 the AI agent detects missing or ambiguous nodes by locating required nodes that are empty, null, or semantically underspecified. Detected gaps are classified by type, for example missing identifier, missing timestamp, ambiguous actor, or incomplete rationale. At block 1258 the agent cross-references external context sources to resolve gaps, including system logs, firewall records, network traffic captures, historical opnotes in the opnotes corpus, and/or related telemetry. Cross-referencing yields candidate supplemental values such as a specific port number, an inferred actor identity, or a corroborating timestamp.

At block 1260 the AI agent assigns a confidence score to each candidate insertion. Confidence scores can be computed using an ensemble of evidence signals including model-based likelihoods from one or more machine learning classifiers, statistical correlations from log analysis, provenance and/or source reliability weights, and calibration factors derived from historical operator accept/reject outcomes. The scoring process incorporates metadata such as timestamp alignment, source trust level, and/or consistency with recent events to produce a calibrated probability that a candidate insertion is correct.

At block 1262 candidate insertions are flagged for generation. In embodiments, candidate insertions are flagged only when their confidence score exceeds a predetermined threshold. In embodiments, candidates below the threshold may be queued for human review, used to prompt follow-up data collection, or discarded. Flagged insertions are formatted as grammar-compliant insertions and returned to the MCP server for downstream processing, which can include automatic integration into an updated parse tree and/or presentation to an operator via the opnote validation interface for accept, edit, or reject actions. This pipeline balances automated augmentation with conservatism to minimize erroneous documentation while preserving efficiency and traceability.

Figure 13:
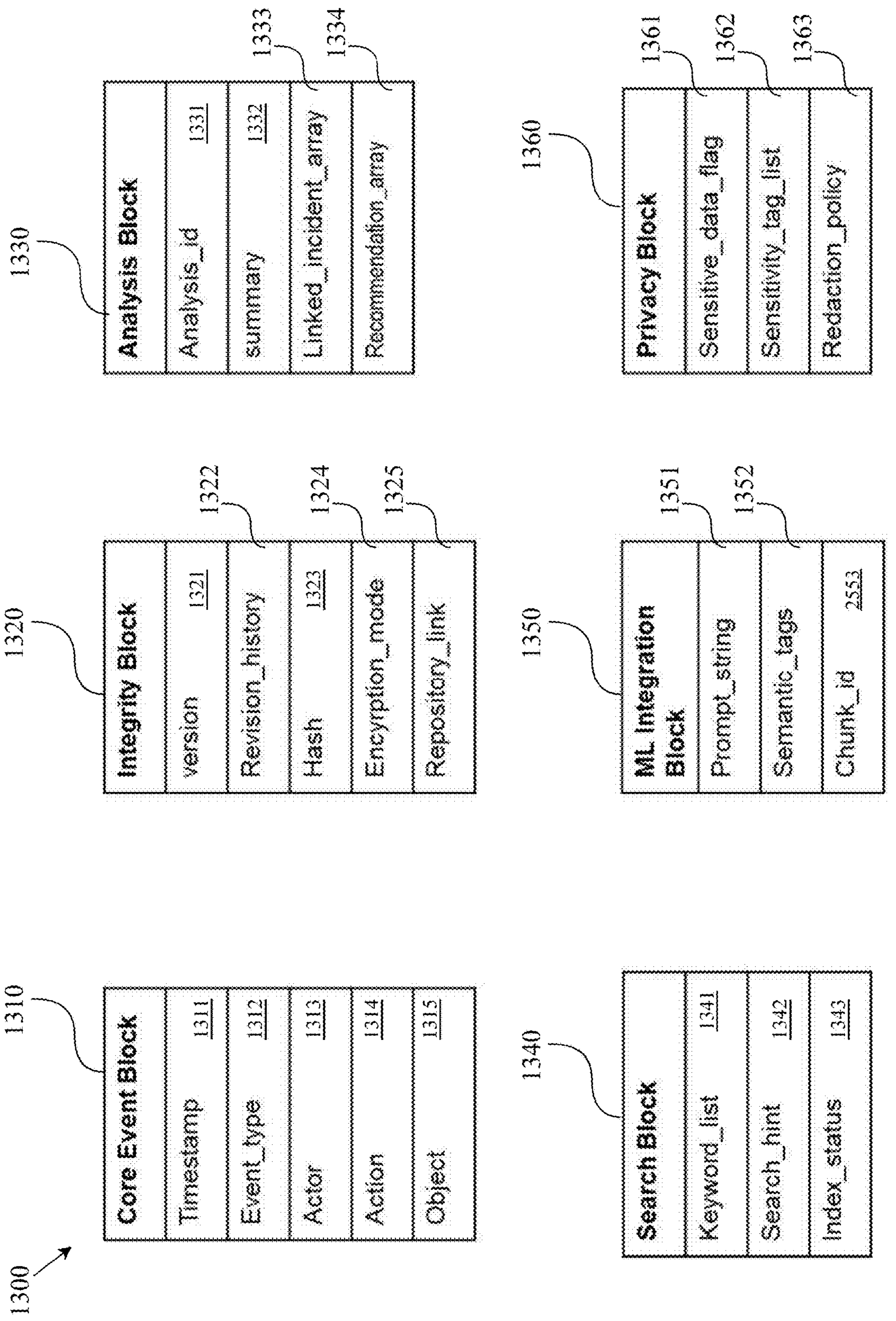
FIG. 13 is a block diagram illustrating elements of an opnotes file structure, including core event fields, metadata, and integration components, according to an embodiment.

In the context of the enhanced opnotes file structure the flagged insertions from block 1262 are formatted to populate the corresponding fields of the opnotes file structure described in FIG. 13. Specifically, candidate insertions identified as actor-related are mapped to the actor field 1313, action-related insertions populate the action field 1314, and temporal gaps are resolved to update the timestamp field 1311. The confidence scores computed at block 1260 are utilized as input for behavioral characteristic analysis, which subsequently generates the risk scores and classifications stored in the analysis block 1330 of the opnotes file. This integration between the parse tree gap detection of FIG. 12 and the structured opnotes file format enables the AI-assisted processing of operational events.

FIG. 13 is a block diagram 1300 illustrating elements of an opnotes file structure, including core event fields, metadata, and integration components. The opnotes file structure can include one or more blocks, where each block contains one or more fields, and/or subfields. At 1310 a core event block is shown. The core event block 1310 can include multiple fields, including timestamp field 1311. The timestamp field 1311 can store a timestamp in a variety of formats, including GPS seconds, Linux seconds, or other suitable epoch representations. In some embodiments, the timestamp field stores a value in an ISO-8601 format. The timestamp can represent a creation time for the opnotes file, a creation time for a current version of the opnotes file, and/or other relevant time such as a last modification time. The core event block 1310 can further include an event_type field 1312. In embodiments, the event_type field 1312 can be an enumerated type to represent various types of events, such as command execution, system response, operator observation, and/or anomaly detected. Other types of events may be represented in some embodiments. The core event block 1310 can further include an actor field 1313. In one or more embodiments, the actor field can be a string to indicate an entity that initiates the event. Example string values for the actor field can include "firewall," "admin_user," "AI_agent," and/or other suitable identifiers. The core event block 1310 can further include an action field 1314. In one or more embodiments, the action field can be a string to indicate an action that was performed or initiated. Example string values for the action field can include "blocked," "executed," "logged," and/or other suitable identifiers. Actions can include cybersecurity-related actions. In embodiments, cybersecurity-related actions can include at least one of: triggering an alert, updating a threat model, modifying access permissions, or initiating a red-team simulation. The core event block 1310 can further include an object field 1315. In one or more embodiments, the object field can be a tuple that includes a type and an identifier, to indicate a target of an action that was performed or initiated, such as is shown at. Example tuple values can include a type of "port" and an identifier of "8080", or a type of "file" and an identifier of "iptables.dat."

At 1320, an integrity block is shown. The integrity block can include one or more fields to support tracking and/or authentication of an opnotes file. The integrity block 1320 can include a version field 1321. In one or more embodiments, the version field 1321 can store a semantic version string (e.g., "v1.0.3") or numeric identifier that indicates a format version of the opnotes file structure. The version field can support compatibility checks and facilitate parsing by downstream systems. The integrity block 1320 can include a revision_history field 1322. In one or more embodiments, the revision_history field 1322 can reference an array of objects, where each object includes at least a timestamp, a version identifier, and a change summary string. The integrity block 1320 can include a hash field 1323. In one or more embodiments, the hash field 1323 can store a cryptographic hash value, such as a SHA-256 digest, computed over all or part of the opnotes file. The hash field can be used to verify file integrity, detect tampering, and/or support digital signature workflows. The integrity block 1320 can include an encryption_mode field 1324. In one or more embodiments, the encryption_mode field 1324 can specify an encryption type, such as AES-256, RSA-2048, or other suitable symmetric or asymmetric encryption schemes. The encryption_mode field can assist in determining how the opnotes file or portions thereof are encrypted and decrypted. The integrity block 1320 can include a repository_link field 1325. In one or more embodiments, the repository_link field 1325 can include a uniform resource locator that points to a secure repository such as a Git repository or blockchain-based digital ledger. In embodiments, storing the output includes storing the opnotes file in a blockchain-based distributed ledger system. The repository_link can enable a richer history to be stored regarding each opnotes file, so that the size of the opnotes file does not need to increase as the history of an opnotes file increase. In embodiments, the opnotes file includes a repository link field, and wherein the system is further configured to retrieve a revision history for the opnotes file based on the repository link field; and render a representation of the revision history that is rendered and presented on an electronic display. The revision history can include an author, date and time, and reason for each revision of an opnotes file.

At 1330, an analysis block is shown. The analysis block can include one or more fields for recording results of analysis of an opnotes file by a machine learning model, such as a Large Language Model (LLM). The analysis block 1330 can include an analysis_id field 1331. In one or more embodiments, the analysis_id field 1331 can store a unique identifier associated with a specific analysis instance. The identifier can be a UUID, hash string, and/or other suitable value that enables traceability and differentiation between multiple analyses of the same opnotes file. In embodiments, the opnotes file includes an analysis field, and wherein the system is configured to retrieve a linked incident array based on the analysis field. The analysis block 1330 can include a summary field 1332. In one or more embodiments, the summary field 1332 can include a text string, compressed text string, and/or other representation that conveys a summary of the analysis of the opnotes file by a machine learning model. The summary can include natural language output, structured annotations, and/or other suitable formats depending on the model used. The analysis block 1330 can include a linked_incident_array field 1333. In one or more embodiments, the linked_incident_array field 1333 can include a reference to a list of arrays identifying related incidents. In some embodiments, a relationship to the related incidents is also recorded. Example relationships can include "caused by," "causes," "blocks," "is blocked by," "is similar to," and/or other suitable relationships between the opnotes file and other opnotes files that record related incident.

The analysis block 1330 can include a recommendation_array field 1334. In one or more embodiments, the recommendation_array field 1334 can include a reference to a list of recommendations to take based on information within an opnotes file. The recommendations can be AI-generated, human-generated, and/or human-curated AI-generated recommendations. Examples of such recommendations can include initiating a network audit, updating firewall rules, isolating a suspicious endpoint, notifying a compliance officer, adjusting alert thresholds, or scheduling a follow-up review. In some embodiments, each recommendation may be associated with a confidence score, priority level, and/or justification string to assist operators in triaging and implementing suggested actions.

At 1340, a search block is shown. The search block 1340 can include one or more fields to facilitate searching of opnotes files. The search block 1340 can include a keyword_list field 1341. In one or more embodiments, the keyword_list field 1341 can include one or more keywords to support search operations. The keywords can be manually added by a user and/or automatically generated by a machine learning model or AI agent based on summarization of the opnotes file content. In embodiments, the opnotes file includes a keyword list field comprising an array of strings, and wherein the system is configured to perform a search operation using one or more regular expressions applied to, or based on, the keyword list field.

The search block 1340 can include a search_hint field 1342. In one or more embodiments, the search_hint field 1342 can include semantic tags, regular expressions, and/or other structured data to facilitate efficient searching. The search_hint field can assist in narrowing search scope, improving relevance, and enabling advanced query matching. The search block 1340 can include an index_status field 1343. In one or more embodiments, the index_status field 1343 can be an enumerated type indicating whether the opnotes file is indexed, non-indexed, or undergoing indexing. The index_status field can support synchronization with external indexing systems and help determine readiness for search-based retrieval.

At 1350, a machine learning integration block is shown. The machine learning integration block 1350 can include one or more fields to optimize interaction with machine learning models such as Large Language Models (LLMs), Large Action Models (LAMs), and/or other suitable models. The machine learning integration block 1350 can include a prompt_string field 1351. In one or more embodiments, the prompt_string field 1351 can include a prompt suitable for input to a machine learning model. Example prompts can include "review this opnotes file for missing information," "what systems are affected by this warning message," and/or other suitable instructions. In some embodiments, an operator enters the data for the prompt_string field 1351 via a user interface, such as a webpage or other suitable input mechanism. The machine learning integration block 1350 can include a semantic tags field 1352. In one or more embodiments, the semantic_tags field 1352 can include one or more tags that describe the thematic or contextual content of the opnotes file. These tags can be generated manually or automatically and can assist in selecting appropriate models, routing prompts to specialized agents, or filtering results based on domain relevance. The machine learning integration block 1350 can include a chunk_id field 1353. In one or more embodiments, the chunk_id field 1353 can store an identifier associated with a specific portion or segment of the opnotes file. The chunk_id can be used to associate the prompt_string and semantic_tags with a particular section of the file, enabling more targeted analysis or response generation. By using chunk_ids, disclosed embodiments can support fine-grained interactions with large or segmented opnotes files, allowing machine learning models to operate on relevant subsets of data without requiring full context ingestion.

At 1360, a privacy block is shown. The privacy block 1360 can include one or more fields to facilitate protection of the contents of opnotes files. The privacy block 1360 can include a sensitive_data_flag field 1361. In one or more embodiments, the sensitive_data_flag field 1361 can be implemented as a Boolean value to indicate whether the opnotes file includes personally identifiable information (PII), protected health information (PHI), and/or other sensitive content. The privacy block 1360 can include a sensitivity_tag_list field 1362. In some embodiments, the sensitivity_tag_list field 1362 can represent a list of strings that indicate the type(s) of sensitive data present in the opnotes file. Example values can include "PII," "phone number," "ip_address," and/or other suitable tags. The privacy block 1360 can include a redaction_policy field 1363. In one or more embodiments, the redaction_policy field 1363 can reference a data structure that defines how redaction is handled in downstream applications. The data structure can include an auto_redact Boolean flag. When set to true, one or more embodiments may automatically redact sensitive fields so that those fields are not viewable when the opnotes file is rendered and presented on an electronic display. Additional fields in the data structure referenced by the redaction_policy field 1363 can include an access_roles array that lists roles permitted to view unredacted content (e.g., "admin," "compliance_officer," and/or other authorized roles). Further fields can include a redacted_fields array that identifies specific fields to be masked or removed during display. In some embodiments, the redaction_policy may also include expiration timestamps, audit logging preferences, and/or conditional redaction rules based on context or user role. In embodiments, the opnotes file includes a redaction policy field, and wherein the system is further configured to perform an automatic redaction process based on the redaction policy field and a permission level of an authorized user. Some embodiments may include more, fewer, or different blocks than those depicted in FIG. 13.

Figure 14:
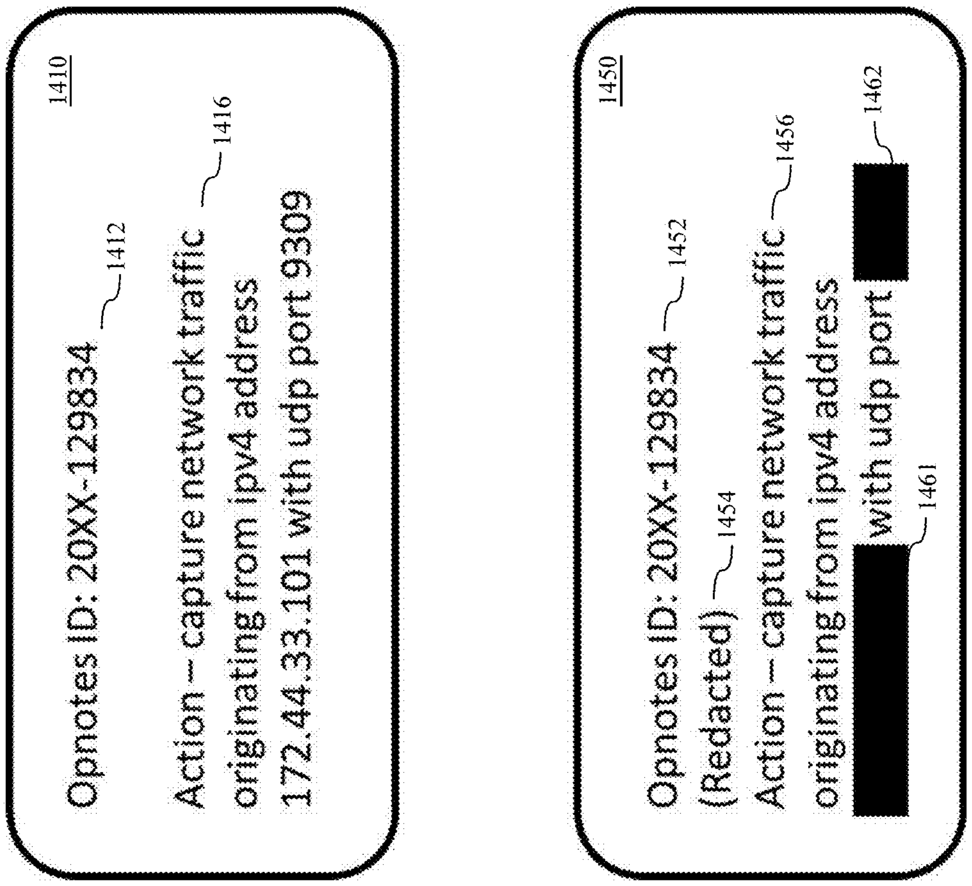
FIG. 14 is an example display illustrating visual differences between unredacted and redacted versions of opnotes data, based on a redaction policy and user clearance level, according to an embodiment.

FIG. 14 is an example display illustrating visual differences between unredacted and redacted versions of opnotes data, based on a redaction policy and user clearance level. Display 1410 shows unredacted opnotes data, including an opnotes ID 1412 of "20XX-129834" and an action statement 1416. The opnotes ID can include an alphanumeric string that uniquely identifies an opnotes file. The action statement 1416 indicates capture of network traffic originating from an IPv4 address "172.44.33.101" using UDP port "9309." This unredacted view may be presented to users with sufficient clearance, such as administrators or compliance officers, depending on the access_roles defined in the redaction policy.

Referring now to display 1450, a redacted version of the same opnotes file is shown. The opnotes ID 1452 is displayed as "20XX-129834," confirming that both displays correspond to the same underlying opnotes data. The action statement 1456 is a redacted version of action statement 1416, with a redaction block 1461 obscuring the IP address and a second redaction block 1462 obscuring the port number. A redaction indication 1454 serves as notice to a user that the information presented on display 1450 is redacted. While the redaction blocks are depicted as black overlays in this example, other visual styles may be used in practice, including blurred regions, color-coded masks, or placeholder text. These visual techniques help prevent unauthorized viewing of sensitive content while preserving contextual structure for downstream rendering and review. In embodiments, the automatic redaction process includes replacing sensitive field values with placeholder tokens, and wherein the system is configured to log each redaction event in an audit trail associated with the opnotes file.

Figure 15:
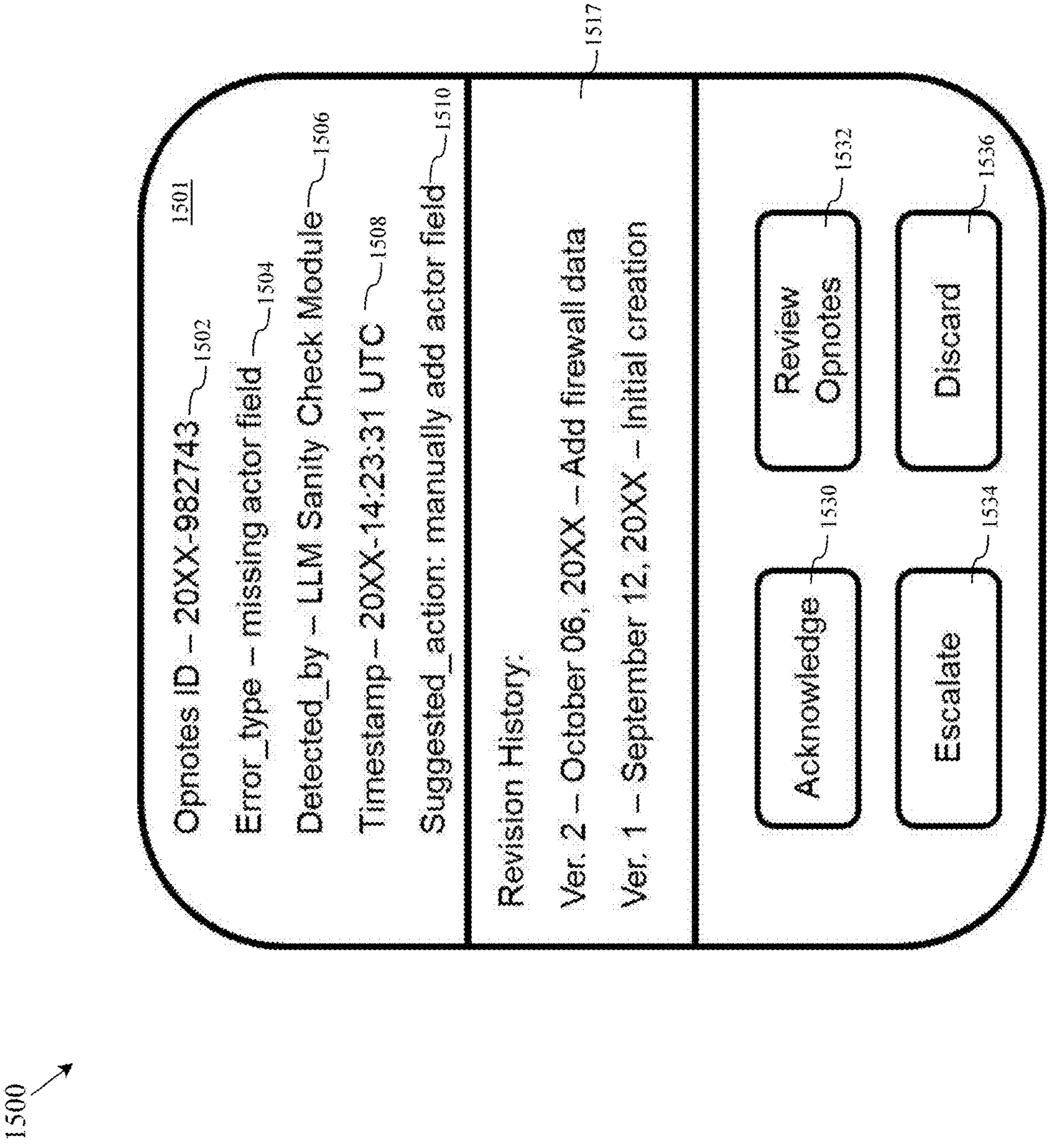
FIG. 15 is an exemplary user interface for alerting an operator to missing or inconsistent opnotes information, including actionable buttons for review, escalation, acknowledgment, and other workflow options, according to an embodiment.

FIG. 15 is an exemplary user interface 1500 for alerting an operator to missing or inconsistent opnotes information, including actionable buttons for review, escalation, acknowledgment, and other workflow options. The user interface 1500 includes an opnotes file alert message 1501 that can present information pertaining to an opnotes file. In embodiments, the alert message is transmitted to a designated role-based endpoint selected from a group consisting of: a compliance dashboard, a security operations center, and a training feedback system. The designated role-based endpoint can include a desktop computer, laptop computer, tablet computer, smartphone, wearable computing device, and/or other suitable computing device. The displayed information can include an opnotes ID 1502. In addition, the display section can include an error_type field 1504. The error_type field can convey an error code and/or an error string that explains the nature of the reported issue.

The user interface 1500 can further include a detected by field 1506 that identifies the person or entity that reported the error. This may include a human operator, automated system, or AI agent. The user interface 1500 can also include a suggested_action field 1508. In one or more embodiments, the suggested_action field 1508 can include a string that indicates a recommended response. Example actions can include data correction, reporting escalation, annotation, or other suitable remediation steps. The suggested action may be entered manually by a human operator or automatically generated by an AI agent based on contextual analysis of the opnotes file. The user interface 1500 can further include a suggested_action field 1510 that can include one or more suggestions for mitigating errors or warnings. In embodiments, the suggestions can come from an AI agent, human user, and/or human curation of an AI agent.

The user interface 1500 can include a revision history 1517. The revision history 1517 can display one or more entries representing versions of a given opnotes file. In one or more embodiments, each entry in the revision history can include metadata such as a creation date, an identifier for the user or entity that created or modified the version, and a comment or summary string describing the reason for the revision. The revision history can assist in tracking changes over time, supporting audit workflows, and enabling collaborative editing of opnotes files.

The user interface 1500 may include multiple actionable elements to facilitate review, escalation, and lifecycle management of opnotes data. The user interface 1500 can include an acknowledge button 1530. When the acknowledge button 1530 is invoked, it causes the system to accept the opnotes file corresponding to the opnotes ID 1502. Acceptance may include marking the file as reviewed, updating its status in a repository, and/or triggering downstream workflows. The user interface 1500 can further include a review opnotes button 1532. When the review opnotes button 1532 is invoked, it causes the system to render and present a user interface that enables editing of the opnotes file corresponding to the opnotes ID 1502. Editing may include modifying fields, updating metadata, and/or appending annotations.

The user interface 1500 may further include an escalate button 1534. When the escalate button 1534 is invoked, it causes the system to perform an escalation process on the opnotes file corresponding to the opnotes ID 1502. The escalation process can include transmitting the opnotes file to one or more remote computing devices, such as smartphones or laptops associated with stakeholders. The escalation process can also include posting the opnotes file and/or a summary to a dashboard, website, and/or other suitable digital entity for broader visibility. Additionally, the escalation process can include modifying the display of the opnotes file to emphasize urgency, such as changing colors, adjusting fonts, adding alert icons, and/or other suitable techniques. The user interface 1500 may further include a discard button 1536. When the discard button 1536 is invoked, it causes the system to discard the opnotes file corresponding to the opnotes ID 1502. A user may opt to remove an opnotes file when it is deemed incorrect, uncorrectable, obsolete, superseded, or otherwise unsuitable for retention. Other options besides the four shown in FIG. 15 may be present in some embodiments, such as a defer button to postpone action, a comment button to append reviewer notes, or a duplicate button to clone the opnotes file for parallel workflows. One or more embodiments can include generating an alert message in response to detecting one or more inconsistencies in the opnotes file, based on the parameter check, the alert message comprising an opnotes identifier, an error type, and a timestamp.

Figure 16:
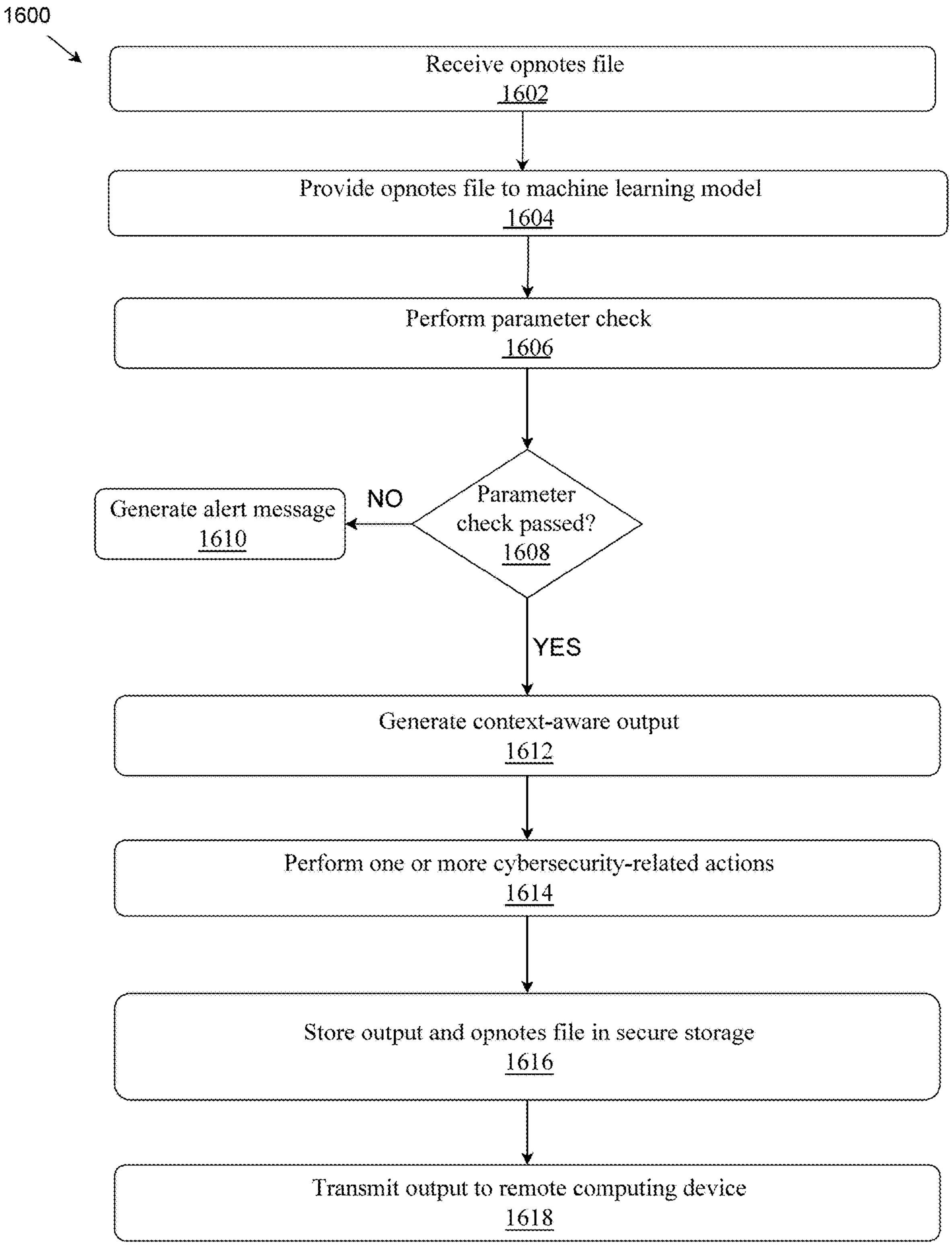
FIG. 16 is a flow diagram illustrating an exemplary method for AI-enabled processing of operational events, including parameter checks, behavioral analysis, and cybersecurity actions, according to an embodiment.

FIG. 16 is a flow diagram 1600 illustrating an exemplary method for AI-enabled processing of operational events, including parameter checks, behavioral analysis, and cybersecurity actions. The flow diagram 1600 starts at block 1602, where an opnotes file is received. The opnotes file can include fields such as those depicted in FIG. 13. The flow continues to block 1604, where the opnotes file is provided to a machine learning model. In one or more embodiments, the machine learning model can include a Large Language Model (LLM), a domain-specific classifier, or other suitable model configured to analyze operational context and extract relevant insights. In embodiments, the machine learning model includes a Large Language Model (LLM), and wherein opnotes file structure further comprises a LLM integration section, wherein the LLM integration section includes a prompt header field and a semantic tags field, wherein the semantic tags field includes an array of strings, and wherein the LLM is configured to read the prompt header field and semantic tags in order to produce an opnotes characterization for the opnotes file.

The flow continues to block 1606, where a parameter check is performed. The parameter check can include validating field formats, verifying timestamp consistency, and detecting missing or anomalous values. At decision block 1608, a determination is made as to whether the parameter check passed. If the parameter check fails, the flow proceeds to block 1610, where an alert message is generated. The alert message can include a summary of the detected issue and may be transmitted to a user interface, dashboard, or remote device for review. In embodiments, the parameter check includes confirming presence of a non-null actor value, non-null action value, and a non-null object value.

If the parameter check passes, the flow continues to block 1612, where context-aware output is generated. This output can include summaries, recommendations, or annotations derived from the opnotes file and model analysis. In one or more embodiments, the context-aware output can further include a risk score associated with the operational event. The risk score can be calculated based on behavioral characteristics of the actor or action, such as frequency, deviation from baseline, known threat patterns, and/or correlation with prior incidents. The risk score can be expressed as a numeric value, categorical label (e.g., “low,” “medium,” “high”), or composite indicator combining multiple factors. This score can assist in prioritizing response actions, triggering automated containment procedures, and/or escalating the event to designated stakeholders for further review. At block 1614, one or more cybersecurity-related actions can be performed. These actions can include triggering alerts, updating firewall rules, logging events, and/or initiating containment procedures. The flow then proceeds to block 1616, where the output and opnotes file are stored in secure storage. Embodiments can include using a journaling file system as part of the storage process. In embodiments, the opnotes file structure includes a journal entry field, and wherein the system is configured to store the opnotes file on a journaling filesystem that supports atomic writes and rollback capability in multi-user environments. Finally, at block 1618, the output is transmitted to one or more remote computing devices, such as stakeholder dashboards, mobile devices, and/or automated response systems.

Figure 17:
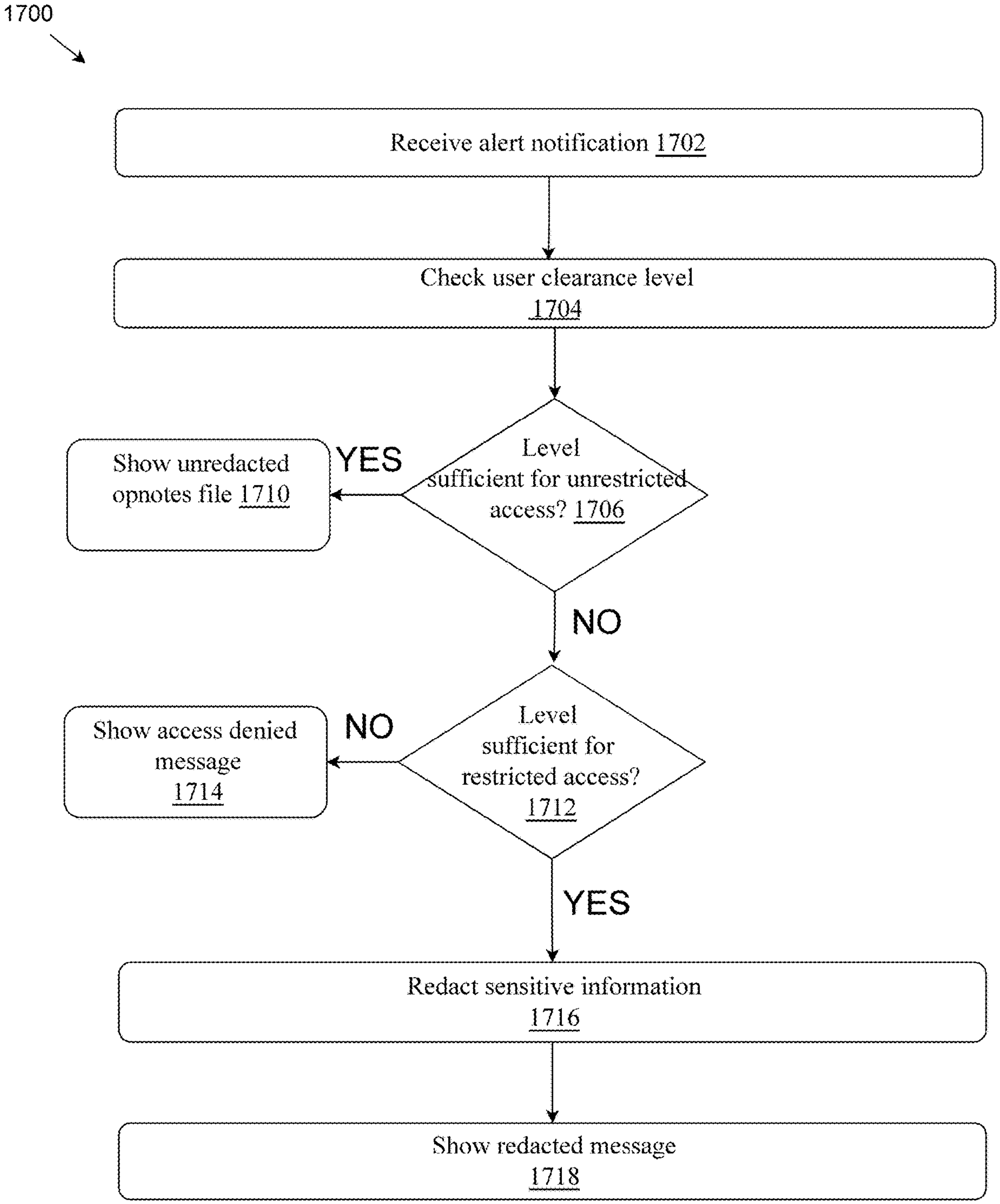
FIG. 17 is a flow diagram illustrating an exemplary method for opnotes alert handling, including clearance checks, redaction logic, and user interaction pathways, according to an embodiment.

FIG. 17 is a flow diagram 1700 illustrating an exemplary method for opnotes alert handling, including clearance checks, redaction logic, and user interaction pathways. The flow diagram 1700 starts at block 1702, where an alert notification is received. The alert notification can indicate receipt of a new opnotes file. The flow continues to block 1704, where a user clearance level is checked. In embodiments, the user clearance level can be determined based on a currently logged-in user to a system used for viewing/editing opnotes files. The flow continues to block 1706, where a check is made to determine if the current user has a privilege level sufficient for unrestricted access. In embodiments, this can include comparing information regarding the current user to data in the privacy block (1360 of FIG. 13) of the opnotes file. Based on the comparison, if it is deemed that the user has unrestricted privileges, the flow continues to block 1710, where the unredacted opnotes file is shown, such as depicted at 1410 of FIG. 14.

If the user does not have unrestricted access, the flow proceeds to decision block 1712, where a determination is made as to whether the user has a clearance level sufficient for restricted access. If the user lacks sufficient clearance for restricted access, the flow continues to block 1714, where an access denied message is shown. This message can include a summary of the restriction and may prompt the user to contact an administrator or compliance officer. If the user does have sufficient clearance for restricted access, the flow continues to block 1716, where sensitive information in the opnotes file is redacted. Redaction can be performed based on the redaction_policy field (1363 of FIG. 13), and may include masking fields, applying visual overlays, and/or removing sensitive content entirely. The flow then proceeds to block 1718, where a redacted version of the opnotes file is shown, such as depicted at 1450 of FIG. 14. The redacted display can preserve contextual structure while preventing unauthorized access to sensitive data.

As can now be appreciated, disclosed embodiments can provide systems and methods for structuring, analyzing, and securing operational note (opnotes) files using modular data blocks, AI-assisted processing, and clearance-aware redaction workflows. By integrating machine learning models, context-aware logic, and privacy-preserving mechanisms, disclosed embodiments can improve the accuracy, completeness, integrity, and security of operational records. These improvements are especially critical in domains such as cybersecurity operations, red-team exercises, and incident response, where timely and trustworthy data can influence containment strategies and post-event analysis. Moreover, disclosed embodiments reduce the burden on human operators by automating validation, redaction, and escalation processes, while preserving flexibility for human-in-the-loop review. Thus, disclosed embodiments can enhance immediate operational effectiveness, as well as contribute to long-term data stewardship, institutional memory, and compliance with evolving security standards.

It will be understood that the foregoing use case examples are presented for illustrative purposes only and are not intended to be limiting. The examples demonstrate how disclosed embodiments may operate in coordination with base system components to annotate existing operational data, identify documentation gaps, and generate enriched opnotes using grammar-based parse trees and AI-assisted context analysis. However, the systems and methods described herein are broadly applicable across a wide range of operational domains, including cybersecurity, infrastructure monitoring, emergency response, and mission-critical logistics.

Other non-limiting use case examples may include documenting coordinated incident response across distributed teams, supplementing sparse field reports with inferred environmental context, enriching security logs with actor attribution and jurisdictional metadata, and/or reconstructing operational timelines from fragmented telemetry and human annotations. In each case, disclosed embodiments may ingest structured and unstructured inputs, normalize and tokenize the data, generate initial parse trees, and apply context-aware augmentation to produce comprehensive and trustworthy documentation. The resulting opnotes may support real-time decision-making, post-operation review, compliance auditing, and long-term trend analysis.

In some embodiments, the system may further incorporate predictive annotation capabilities, enabling the AI agent to anticipate likely next events based on historical patterns and propose pre-filled entries. This reduces latency in record-keeping and improves continuity across operational phases. Additionally, multi-agent collaboration may be employed, with specialized AI agents handling technical telemetry, narrative summaries, and/or compliance tagging in parallel. Coordination among these agents enhances coverage and efficiency while preserving semantic integrity.

Disclosed embodiments may also support integration with external data streams, such as video feeds, RF signals, or sensor outputs, allowing environmental context to be fused directly into the grammar-defined record. Privacy and security layers may be applied to restrict visibility of sensitive nodes, while adaptive grammar evolution ensures that the documentation structure remains aligned with evolving operational practices. In this way, disclosed embodiments can provide a scalable, extensible framework for intelligent documentation that adapts to the needs of both human operators and automated systems.

Accordingly, the scope of the present disclosure should not be limited to the particular implementations, workflows, or domain-specific examples described herein. Variations in system topology, data source integration, modeling techniques, operational roles, deployment environments, and user interface design are considered within the scope of the inventive concepts. Functional subsystems may be embodied in software, hardware, firmware, or any combination thereof, and may be deployed centrally, at the edge, or in hybrid configurations adapted to mission or organizational requirements. The claims are intended to cover all such modifications, equivalents, and variations as fall within the spirit and scope of the appended claims.

Figure 18:
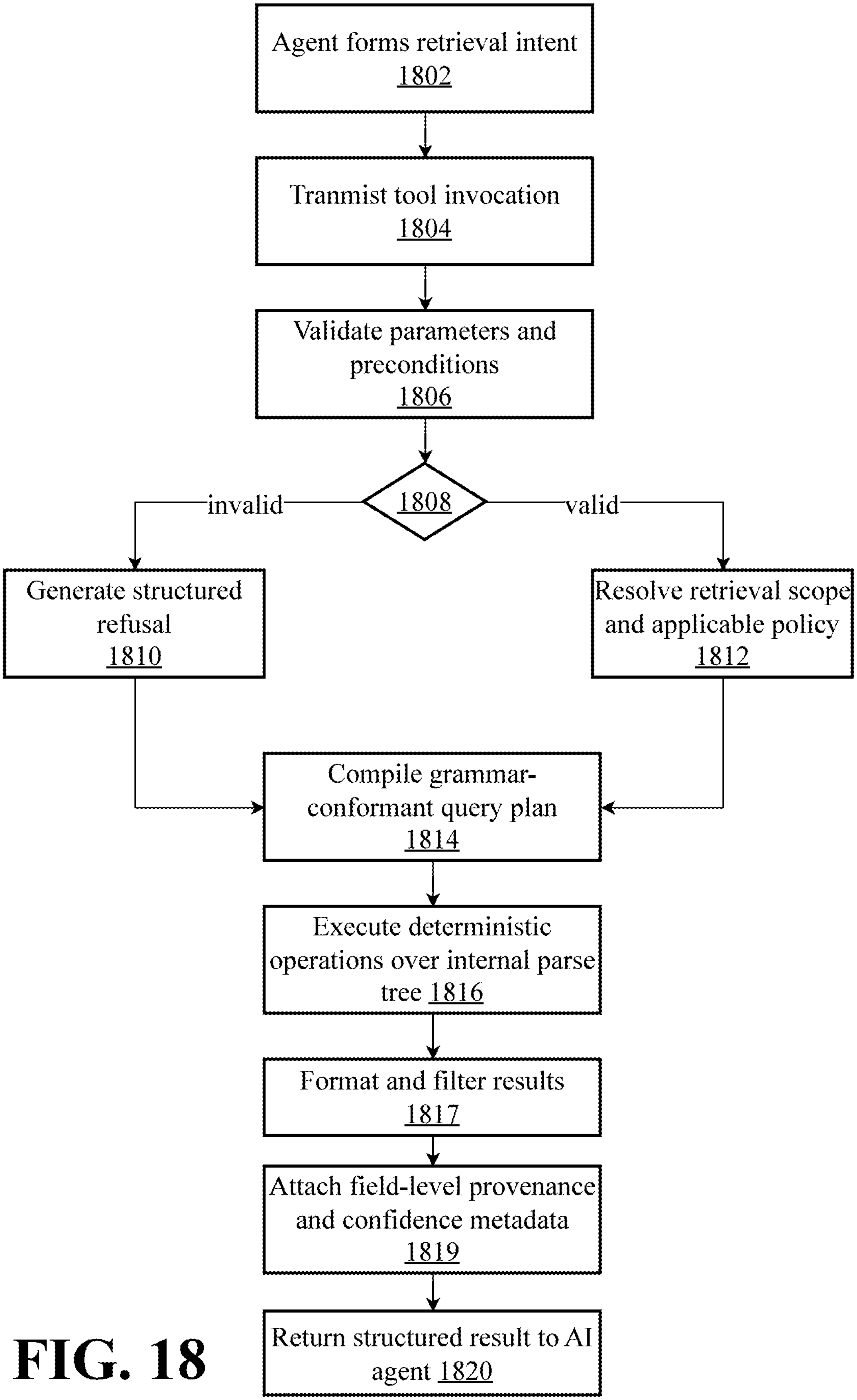
FIG. 18 is a flow diagram illustrating an exemplary method for AI-assisted retrieval of operational events in which an AI agent interacts with an MCP server that encapsulates a grammar-derived parse tree, according to an embodiment.

FIG. 18 is a flow diagram illustrating an exemplary method for AI-assisted retrieval of operational events in which an AI agent interacts with an MCP server that encapsulates a grammar-derived parse tree, according to an embodiment. According to the embodiment, the process begins when the agent forms a retrieval intent at step 1802, such as to obtain credentials, enumerate tradecraft, summarize target infrastructure, or reconstruct a task timeline for a specified target, scope, and time window. The agent transmits a typed tool invocation to the MCP server at step 1804 with schema-conformant parameters; the parse tree itself is not provided to, or traversed by, the agent at any point. Upon receipt, the MCP server validates the parameters and preconditions at step 1806 and determines whether the request is admissible at decision point 1808. If the request is invalid or inconsistent with grammar constraints or organizational policy, the MCP server generates a structured refusal at step 1810 that includes machine-readable diagnostics and a shortlist of permissible alternatives, enabling the agent to reformulate the request without exposure to internal tree topology.

If the request is valid, the MCP server resolves retrieval scope and applicable policy at step 1812, including role-based visibility and redaction rules, and compiles a bounded, grammar-conformant query plan at step 1814. The server then executes deterministic operations over the internal parse tree at step 1816 while continuing to hide node/edge structure and traversal state from the agent. The resulting facts are formatted and filtered according to policy at step 1817, with sensitive fields minimized or removed as required, after which the server attaches field-level provenance and confidence metadata at step 1819 derived from the underlying structures and prior decisions. The MCP server then returns a structured result to the agent at step 1820 that contains only the information necessary to satisfy the retrieval intent, along with provenance references and confidence scores, thereby reducing cognitive and computational load on the agent and preserving a stable interface as the internal grammar evolves.

Figure 19:
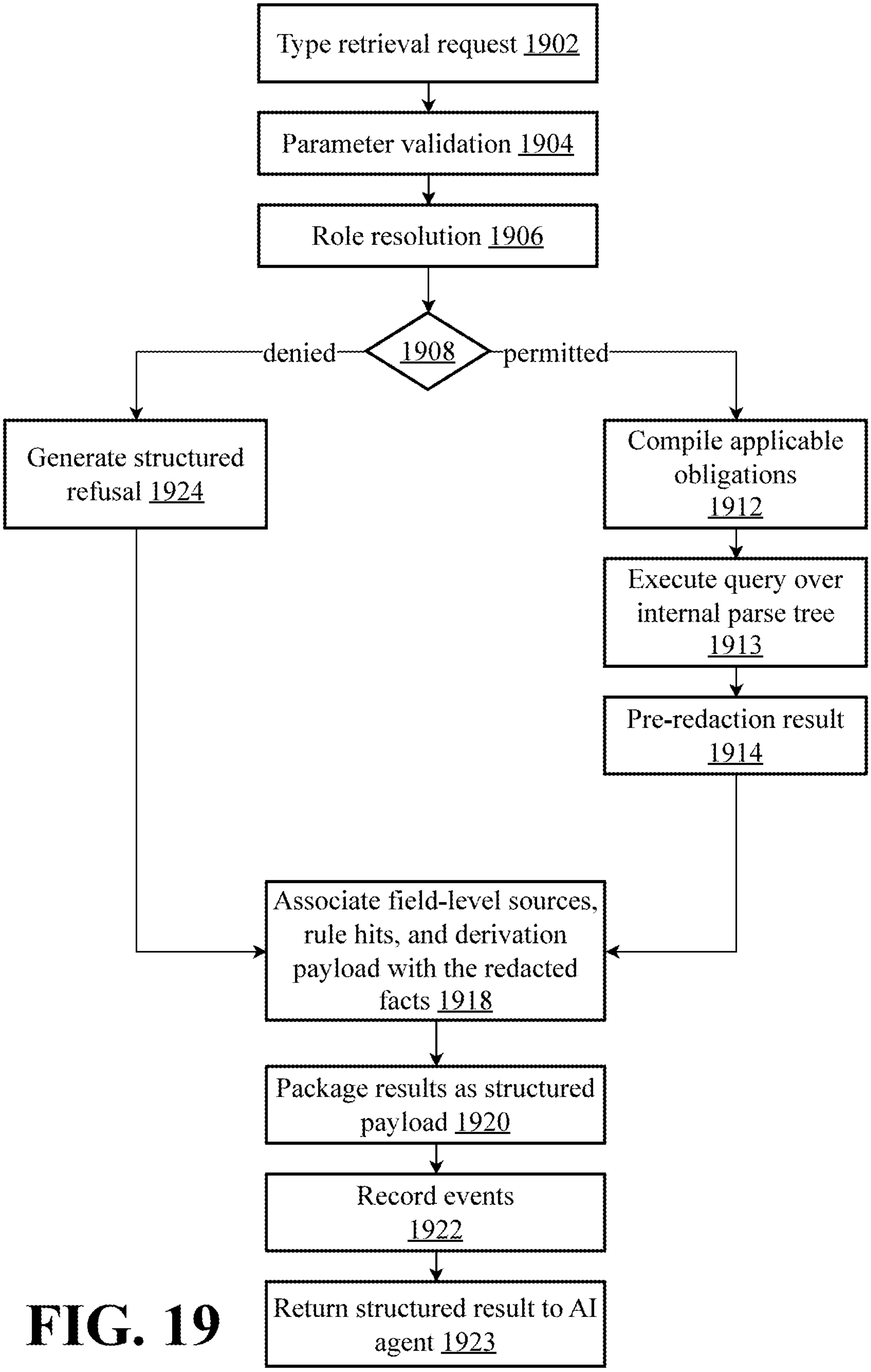
FIG. 19 is a flow diagram illustrating an exemplary method for role-based redaction and provenance flow for retrieval responses served by an MCP server, according to an embodiment.

FIG. 19 is a flow diagram illustrating an exemplary method for role-based redaction and provenance flow for retrieval responses served by an MCP server, according to an embodiment. The process begins when the system receives a typed retrieval request at step 1902 from an AI agent, the request including schema-conformant parameters such as target identifier, scope, and time window. The MCP server validates the parameters and preconditions at step 1904 and resolves the requester's role at step 1906 using a role catalog that maps identities to attributes indicative of operator, reviewer, or auditor privileges. A policy evaluation component acting as a policy decision point 1908 consults a policy store to determine whether the request is permitted, denied, or permitted subject to redaction or other obligations, and then issues a decision.

If the request is denied, the MCP server generates a structured refusal at step 1924 containing machine-readable diagnostics and suggested alternatives, which is returned to the agent at egress. If the request is permitted with obligations, the MCP server compiles applicable obligations at step 1912 including field-level masks, value generalization, and omission rules—and executes a bounded, grammar-conformant query over the internal parse tree at step 1913 to produce a pre-redaction result set at step 1914. A redaction engine applies the obligations, and a confidence scoring component computes per-field metrics based on retrieval provenance and structural consistency. A provenance collector at step 1918 associates field-level sources, rule hits, and derivation steps with the redacted facts, and a response assembler at step 1920 packages the results as a structured payload. In parallel, an audit logger at step 1922 records salient events—tool parameters, policy decisions, redaction rules applied, and provenance digests—into a ledger or version-control store for later review.

At egress, the MCP server returns a redacted, structured response at step 1923 to the agent that includes operational facts along with associated provenance and confidence indicators, and may optionally attach a redaction report summarizing the rules that affected the payload. The agent does not obtain or traverse the internal parse tree at any time; all access is mediated by the MCP interface, which enforces role-based visibility, policy, and grammar constraints while providing predictable and auditable outcomes.

Exemplary Computing Environment

Figure 20:
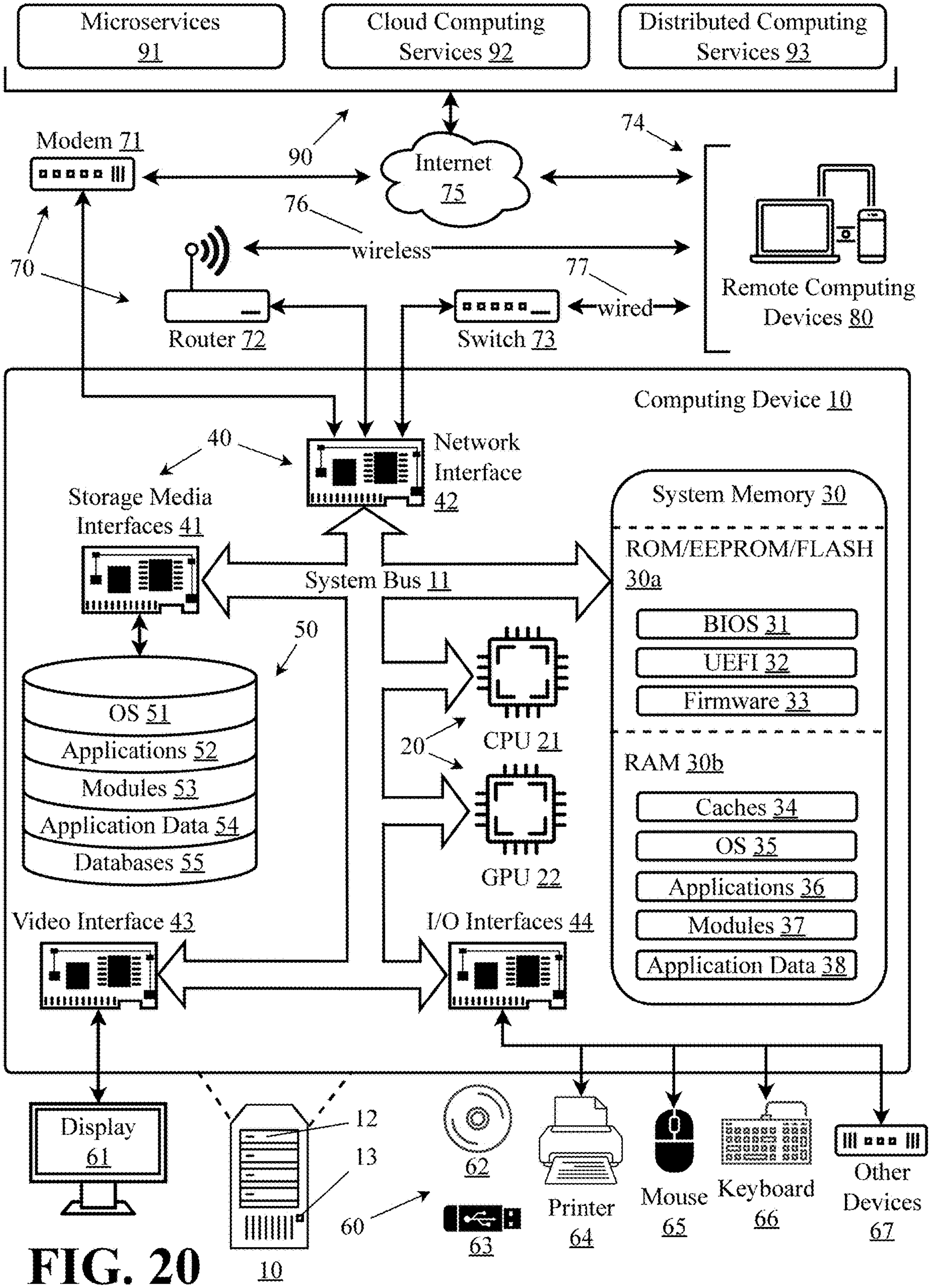
FIG. 20 illustrates an exemplary computing environment on which an embodiment described herein may be implemented, in full or in part.

FIG. 20 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure. The memory can include a non-transitory computer-readable medium.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 13 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, and low latency, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid-state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities. NAND flash memory comes in different types, such as Single-Level Cell (SLC), Multi-Level Cell (MLC), Triple-Level Cell (TLC), and Quad-Level Cell (QLC), each with trade-offs between performance, and endurance. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as performance and availability. For example, Terraform can be used to automatically provision and scale resources on AWS spot instances during periods of high demand, such as for surge rendering tasks, to take advantage while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a container file or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computing system for artificial intelligence-assisted retrieval of operational events, the computing system comprising one or more hardware processors configured for:

maintaining a grammar-derived parse tree containing structured operational notes (opnotes), wherein the grammar-derived parse tree organizes operational events according to grammatical roles including comprising actor, action, object, timestamp, and jurisdiction;

providing a Model Context Protocol (MCP) server that encapsulates the grammar-derived parse tree;

receiving, from an artificial intelligence (AI) agent, a typed tool invocation comprising schema-conformant parameters for retrieving operational information according to a retrieval intent;

using the MCP server to validating validate the typed tool invocation against one or more preconditions and an organizational policy without exposing the grammar-derived parse tree structure to the AI agent;

responsive to successful validation:

resolving retrieval scope and applicable role-based visibility rules;

compiling a bounded, grammar-conformant query plan;

executing deterministic operations over the internal grammar-derived parse tree while hiding node and edge structure from the AI agent;

formatting retrieved facts according to policy constraints; and attaching field-level provenance and confidence metadata to the retrieved facts; and returning a structured result to the AI agent containing only information necessary to satisfy the retrieval intent.

2. The computing system of claim 1, wherein the MCP server exposes a plurality of typed retrieval tools to the AI agent, the tools selected from: retrieve-credential, list-tradecraft, enumerate-targets, summarize-infrastructure, reconstruct-timeline, and fetch-linked-artifact.

3. The computing system of claim 1, wherein responsive to the typed tool invocation violating grammar constraints or organizational policy, the system is configured to:

generate a structured refusal comprising machine-readable diagnostics; and provide a shortlist of permissible alternatives to enable reformulation without exposing topology of the internal grammar-derived parse tree topology.

4. The computing system of claim 1, wherein the system is further configured for resolving a requester role from a role catalog mapping identities to operator, reviewer, or auditor privileges;

evaluating the retrieval request typed tool invocation against a policy store to determine whether the request is permitted, denied, or permitted with obligations; and responsive to the request typed tool invocation being permitted with obligations, applying field-level redaction based on the resolved role.

5. The computing system of claim 4, wherein applying field-level redaction comprises:

compiling applicable obligations including field-level masks, value generalization rules, and omission rules;

executing the grammar-conformant query plan to produce a pre-redaction result set;

applying the obligations via a redaction engine to generate redacted facts; and computing per-field confidence metrics based on retrieval provenance and structural consistency.

6. The computing system of claim 1, wherein the system is further configured to maintain an audit trail by:

recording tool invocation parameters, policy decisions, and redaction rules applied;

generating provenance digests for retrieved facts information; and storing the audit records in a distributed ledger or version-controlled repository.

7. The computing system of claim 1, wherein the structured result includes:

operational facts satisfying the retrieval intent;

provenance references indicating source nodes without revealing tree structure;

confidence scores for each retrieved fact; and a redaction report summarizing rules that affected the structured result.

* * * * *